US012726990B2

(12) United States Patent
Venugopal et al.

(10) Patent No.: US 12,726,990 B2
(45) Date of Patent: Sep. 1, 2026

(54) UL GRANT SELECTION BY UE

(71) Applicant: QUALCOMM Incorporated, San Diego, CA (US)

(72) Inventors: Kiran Venugopal, Green Book, NJ (US); Wooseok Nam, San Diego, CA (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 405 days.

(21) Appl. No.: 17/816,978

(22) Filed: Aug. 2, 2022

(65) Prior Publication Data

US 2024/0049240 A1 Feb. 8, 2024

(51) Int. Cl.
*H04W 72/23* (2023.01)
*H04W 72/02* (2009.01)

(52) U.S. Cl.
CPC .......... *H04W 72/23* (2023.01); *H04W 72/02* (2013.01)

(58) Field of Classification Search
CPC .............................. H04W 72/02; H04W 72/23
See application file for complete search history.

(56) References Cited

U.S. PATENT DOCUMENTS 8,989,125 B1 * 3/2015 Marupaduga .......... H04B 7/024 455/67.11
2010/0008294 A1 * 1/2010 Palanki .................. H04J 11/005 370/328
2012/0176996 A1 * 7/2012 Kim ...................... H04L 5/0057 370/329
2016/0278050 A1 * 9/2016 Nory ..................... H04W 16/14
2016/0345272 A1 * 11/2016 Eriksson ........... H04W 72/0473
2020/0351705 A1 * 11/2020 Chae ..................... H04L 5/0044
2020/0413420 A1 * 12/2020 Nam ..................... H04L 5/0091
2021/0184812 A1 * 6/2021 MolavianJazi ....... H04L 1/0041
2024/0022303 A1 * 1/2024 Zhang .................. H04B 7/0626
2024/0129867 A1 * 4/2024 Ma ...................... H04B 7/18513

* cited by examiner

*Primary Examiner* — Kevin M Cunningham
(74) *Attorney, Agent, or Firm* — Procopio, Cory, Hargreaves & Savitch LLP

(57) ABSTRACT

A network node may transmit an UL grant to a UE, the UL grant including a first subset of UL scheduling information among a plurality of UL scheduling information associated with a PUSCH. The UE may select a second subset of UL scheduling information of the plurality of UL scheduling information other than the first subset of UL scheduling information, and transmit the PUSCH to the network node based on the first subset of UL scheduling information and the second subset of UL scheduling information of the plurality of UL scheduling information.

29 Claims, 14 Drawing Sheets

900

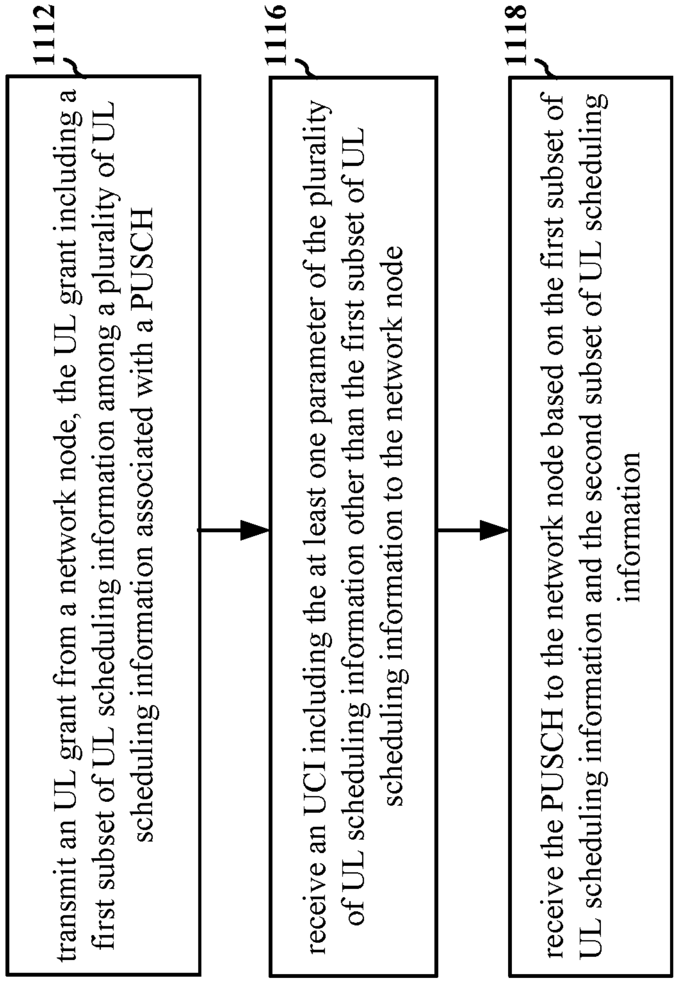
FIG. 11

UL GRANT SELECTION BY UE

TECHNICAL FIELD

The present disclosure relates generally to communication systems, and more particularly, to a wireless communication including at least one uplink (UL) grant parameter selected by a user equipment (UE).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a user equipment (UE) configured to receive an uplink (UL) grant from a network node, the UL grant including a first subset of UL scheduling information among a plurality of UL scheduling information associated with a physical uplink shared channel (PUSCH), select a second subset of UL scheduling information of the plurality of UL scheduling information other than the first subset of UL scheduling information, and transmit the PUSCH to the network node based on the first subset of UL scheduling information and the second subset of UL scheduling information of the plurality of UL scheduling information.

In an aspect of the disclosure, a method, a computer-readable medium, and an apparatus are provided. The apparatus may include a base station configured to transmit an UL grant to a UE, the UL grant including a first subset of UL scheduling information among a plurality of UL scheduling information associated with a PUSCH, receive an uplink control information (UCI) from the UE, the UCI including second subset of UL scheduling information of the plurality of UL scheduling information other than the first subset of UL scheduling information, and receive the PUSCH from the UE based on the first subset of UL scheduling information and the second subset of UL scheduling information of the plurality of UL scheduling information.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 11 is a flowchart of a method of wireless communication.

DETAILED DESCRIPTION

Figure 1:
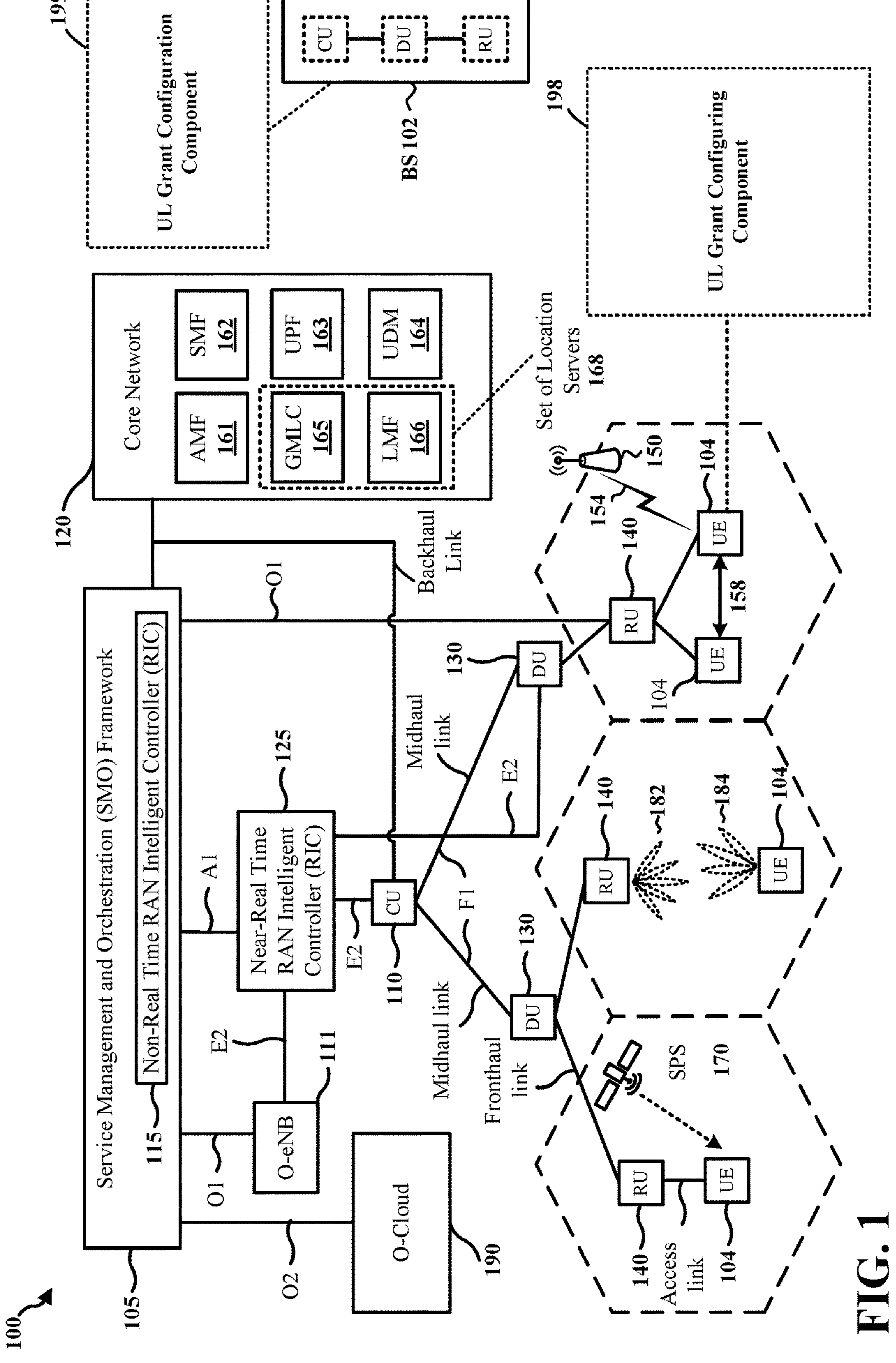
FIG. 1 is a diagram illustrating an example of a wireless communications system and an access network.

A base station acquires uplink (UL) channel state information (CSI) from a user equipment (UE) and uses the CSI to schedule UL communication from the UE. The base station may transmit CSI-RS to the UE and receive a downlink (DL) CSI report from the UE based on measurement of the CSI-RS. In some aspects, the UL CSI may be based on the DL CSI report, e.g., if there is channel reciprocity. In some aspects, the base station may receive a sounding reference signal (SRS) to acquire the CSI for the UE. The network may lengthen the periodicity of acquiring UL CSI to reduce the network resource overhead, which may result in outdated UL CSI and may lead to reduced network throughput and reduced network power efficiency. According to some aspects of the current disclosure, the network node may let the UE select a subset of UL scheduling information or parameters rather than receiving the full set of UL scheduling information from the network. As the UE may have a better understanding of the channel status or conditions at the UE, the UE selection of a subset of UL scheduling information or parameters may reduce the network overhead, while improving the accuracy of communication and increasing the network throughput and network power efficiency.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit—User Plane (CU-UP)), control plane functionality (i.e., Central Unit—Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an AI interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a UL grant configuring component 198 configured to receive an UL grant from a network node, the UL grant including a first subset of UL scheduling information among a plurality of UL scheduling information associated with a PUSCH, select a second subset of UL scheduling information of the plurality of UL scheduling information other than the first subset of UL scheduling information, and transmit the PUSCH to the network node based on the first subset of UL scheduling information and the second subset of UL scheduling information of the plurality of UL scheduling information. In certain aspects, the base station 102 may include a UL grant configuration component 199 configured to transmit an UL grant to a UE, the UL grant including a first subset of UL scheduling information among a plurality of UL scheduling information associated with a PUSCH, receive an UCI from the UE, the UCI including second subset of UL scheduling information of the plurality of UL scheduling information other than the first subset of UL scheduling information, and receive the PUSCH from the UE based on the first subset of UL scheduling information and the second subset of UL scheduling information of the plurality of UL scheduling information. Although the following description may be focused on 5G NR, the concepts described herein may be applicable to other similar areas, such as LTE, LTE-A, CDMA, GSM, and other wireless technologies.

Figures 2A, 2B, 2C, 2D:
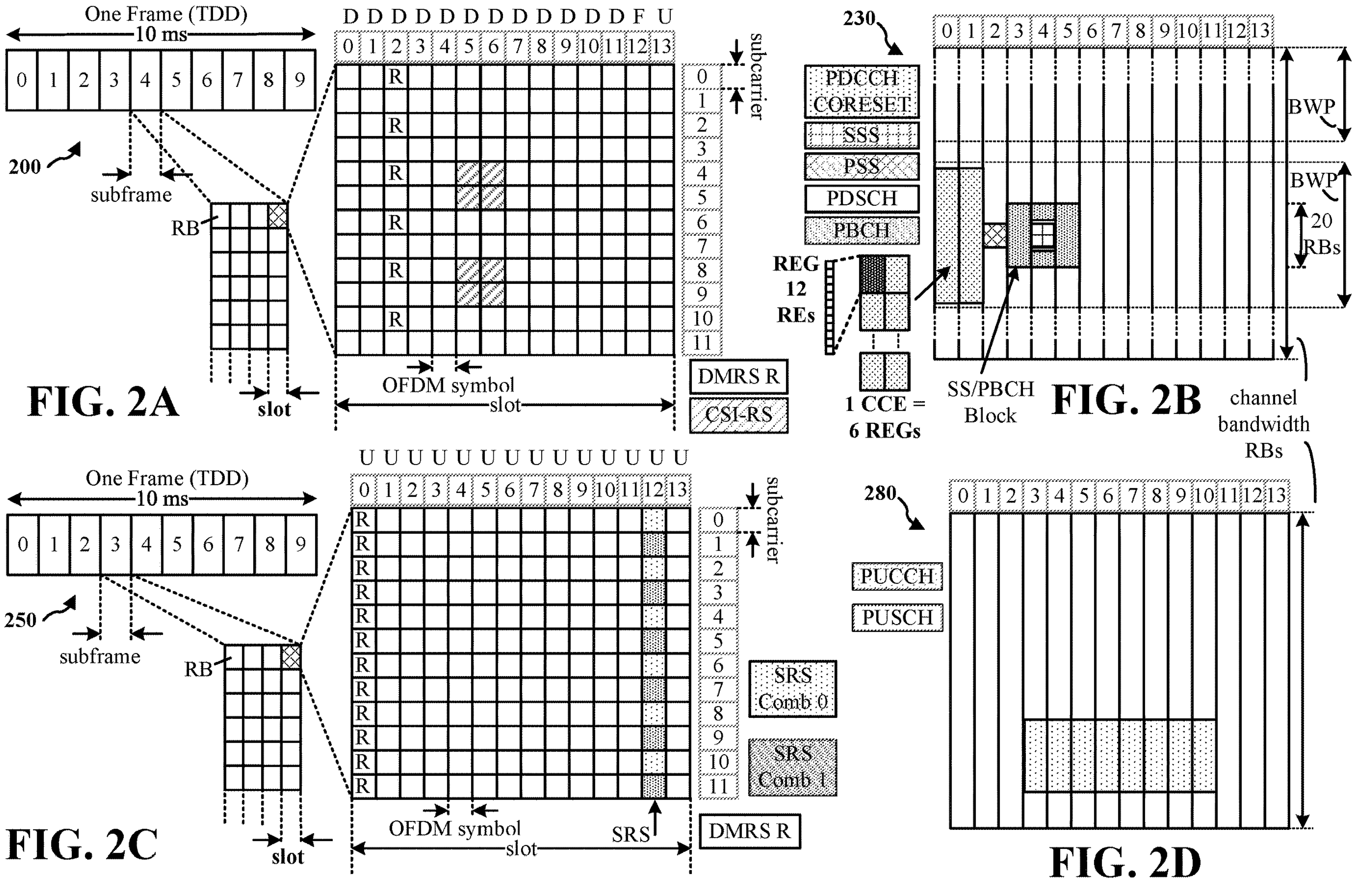
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15$ [KHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK)

feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
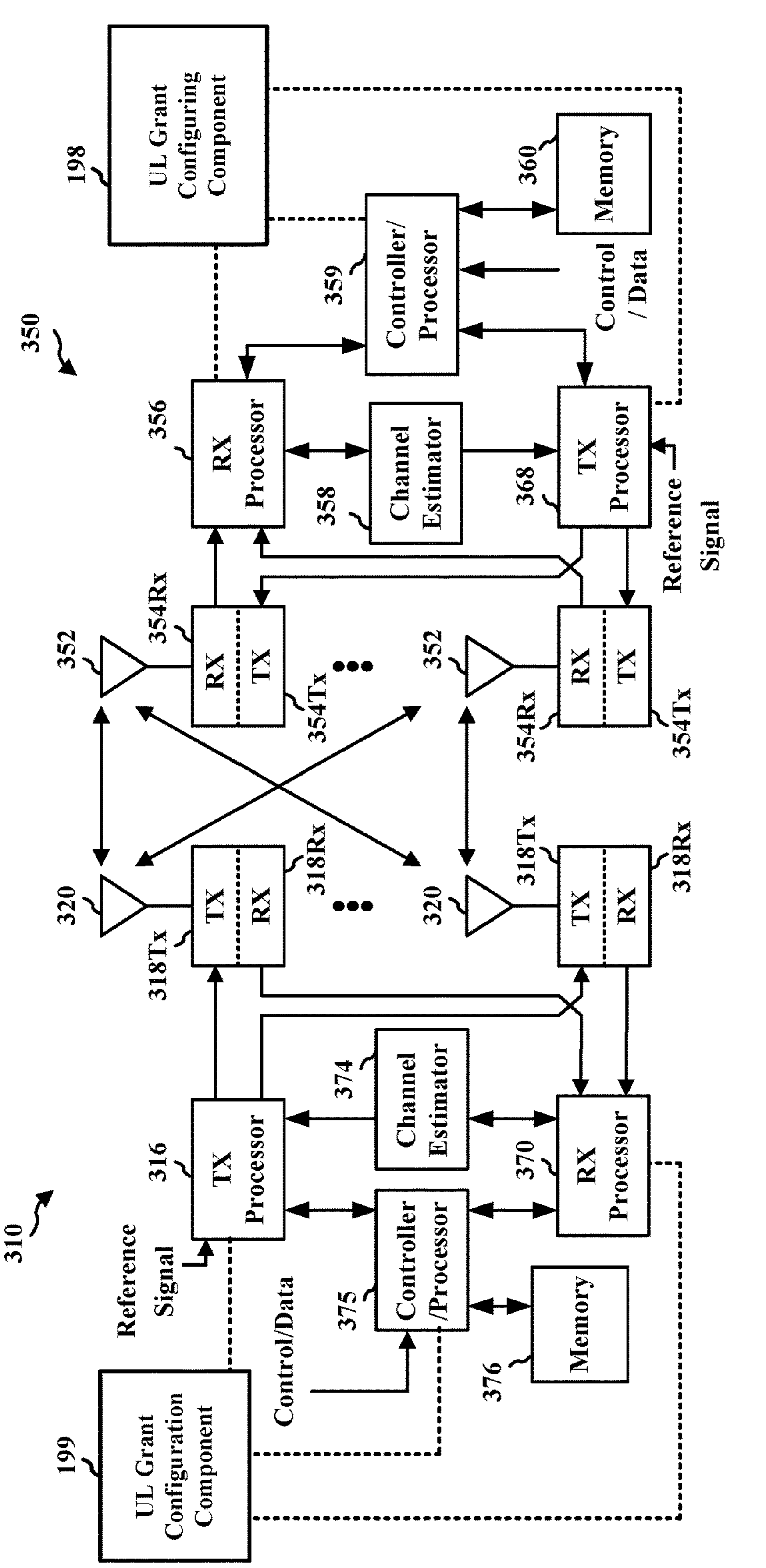
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the UL grant configuring component 198 of FIG. 1. At least one of the TX processor 316, the RX processor 370, and the controller/processor 375 may be configured to perform aspects in connection with the UL grant configuration component 199 of FIG. 1.

A network node (e.g., a base station, such as a gNB, or a component of a base station) may transmit at least one uplink (UL) grant including information or parameters associated with the UL transmissions to the UE to schedule an UL transmission (e.g., the PUCCH or the PUSCH). The UE may transmit the UL data transmission to the network node based on the UL grant. In one example, the UL transmission may be dynamic, and the network node may transmit the UL grant to the UE in a DCI for scheduling the UL transmission. The UL grant may be based on a scheduling request from the UE. In another example, the UL transmission may be semi-statically configured by the network node and scheduled by an UL grant.

The network node may acquire UL channel state information (CSI) from the UE to for the UL scheduling. The base station may transmit CSI-RS to the UE and receive a DL CSI report from the UE based on measurement of the CSI-RS. In some aspects, the UL CSI may be based on the DL CSI report, e.g., if there is channel reciprocity. In some aspects, the base station may receive an SRS to acquire the CSI for the UE, e.g., based on measurements that the network node performs on the SRS. That is, the network node may acquire UL CSI from the UE, e.g., whether using a CSI report or transmission of SRS, and perform the UL scheduling based on the UL CSI received from the UE.

Figures 4A, 4B:
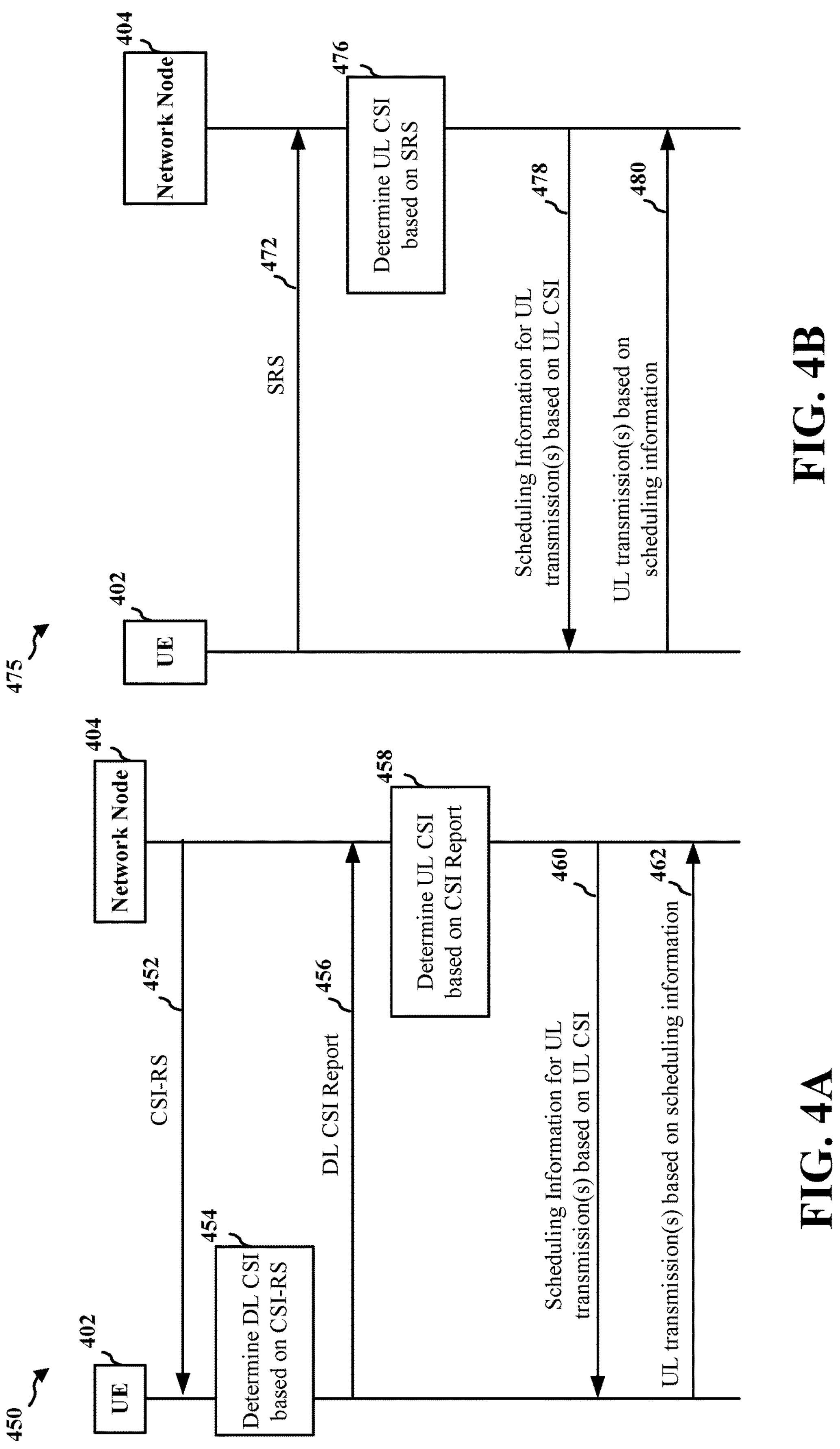
FIG. 4A and FIG. 4B are diagrams showing the acquisition of UL CSI.

In one aspect, the UL CSI may be based on DL CSI report received from the UE, e.g., if there is channel reciprocity between the UL channel and the DL channel. That is, in case of a time division duplex (TDD) mode, the network node may acquire, or derive, information about the UL channel from the DL channel measurements performed by the UE. Based on the channel reciprocity, the network node may determine the UL CSI without additional feedback or UL transmissions (such as SRS) from the UE. FIG. 4A illustrates a diagram 450 showing the acquisition of UL CSI by a network node 404 based on the reception of DL CSI 460 from a UE 402. The network node 404 may transmit a DL CSI reference signal (RS) (CSI-RS) 452 to the UE 402, and the UE 402 may generate the DL CSI report, at 454, by receiving and measuring the CSI-RS 452. The UE 402 then transmits a CSI report 456 with the DL CSI. At 458, the network node 404 may acquire the UL channel knowledge (e.g., the UL CSI) from the DL CSI report 456. Then, the network node 404 transmits scheduling information 460 for one or more uplink transmissions from the UE 402, the scheduling information being based on the UL CSI determined at 458. At 462, the UE 402 transmits the one or more uplink transmissions 462 based on the scheduling information received from the network node 404.

In another aspect, the network node may use a dedicated sounding reference signal (SRS) for UL CSI acquisition and UL beam management. In some aspects, the network node may determine UL CSI from a received SRS in the absence of channel reciprocity. As an example, in a frequency division duplex (FDD) mode or for a supplementary uplink (SUL) channel, the network node may acquire the UL channel knowledge based on a feedback (e.g., UL transmissions such as SRS) from the UE. FIG. 4B illustrates a diagram 475 showing a network node 404 determining UL CSI, at 474 based on SRS 472 received from a UE 402. The UE 402 may transmit the SRS 472 to the network node 404, and the network node 404 may acquire the UL CSI, at 476, based on a measurement of the SRS 472 received at the network node. Then, the network node 404 transmits scheduling information 478 for one or more uplink transmissions from the UE 402, the scheduling information being based on the UL CSI determined at 474. At 480, the UE 402 transmits the one or more uplink transmissions based on the scheduling information 478 received from the network node 404.

The acquisition of the UL CSI including allocating network resources for the corresponding RS (e.g., the CSI-RS or the SRS) and measuring the RS may affect the network overhead, throughput, or power consumption. In one aspect, the resource allocation of an RS (e.g., the CSI-RS and/or SRS) used for acquiring the UL CSI may consume network resource and may reduce the system throughput. That is, if the RS used to acquire the UL CSI is transmitted in x number of symbols out of N number of symbols used for the scheduled communication, the throughput may drop or be reduced by at least by x/N*100%. In another aspect, the RS measurement and transmission, including the reporting (e.g., the DL CSI report) may lead to power consumption resulting in lower network energy efficiency.

On way to reduce the resource overhead for UL CSI acquisition, is to lengthen a periodicity of the CSI-RS or the SRS, e.g., increasing a periodicity of x symbols out of k*N symbols where k>1. The CSI-RS or the SRS with the increased periodicity may reduce the amount of network resources allocated for the transmission of the CSI-RS, the DL CSI report, and/or the SRS. On the other hand, the longer periodicity of the CSI-RS or the SRS may lead to outdated UL CSI. The UL scheduling by the network node (e.g., at 460 or 478) based on outdated UL CSI may reduce the network throughput, because the outdated UL CSI may not properly represent the current UL channel conditions.

In one aspect, the outdated UL CSI may reduce network throughput more than outdated DL CSI because the network node is not aware of the UL traffic state. In case of the DL transmission, the network node may be aware of the traffic state and may configure or reconfigure the CSI acquisition accordingly. In one example, when the DL traffic is relatively heavy (e.g., heavy DL traffic) with higher reliability/latency requirements, the network node may configure the periodic CSI-RS transmission and reporting with a shorter periodicity to maintain more current DL CSI and to schedule the DL traffic based on up to date CSI. In another example, when the DL traffic is relatively sparse (e.g., sparse DL traffic) with relaxed reliability/latency requirements, the network node may configure the periodic CSI with a longer periodicity or aperiodic CSI-RS/reporting. On the other hand, in case of the UL transmission, the network node may not know of the UL traffic state prior to the UL transmission if the UL CSI is not current, and the network node may not be aware of the way to configure or reconfigure the SRS to optimize the UL communication performance.

In another aspect, the outdated UL CSI may reduce network throughput more than the outdated DL CSI because the UL channel state (or condition) may change in a base station-agnostic manner (e.g., in a manner that is not known by or apparent to the network node). In one example, the UE may autonomously respond to the change in DL/UL channel conditions. In one example, the UE may autonomously change its receive (Rx) beams (e.g., using a beam refinement procedure (P3 beam management), and a corresponding UL transmit (Tx) beams if there is a beam correspondence between the Rx beam and the Tx beam) corresponding to a configured TCI state. In another example, the UE may autonomously sense or predict (e.g., estimate) a maximum permissible exposure (MPE), a beam blockage, and other UL degradation events. In another example, the UE may estimate or predict an UL CSI, e.g., based on an AI/ML approach, from multiple candidate inputs that may be available at the UE side (e.g., the DL CSI measurement in other band or RAT) which may be transparent to the network node side.

In some aspects, for the UE to provide the network with an update for the UL CSI or to adapt an SRS configuration, the UE may send a request to the network node. In one example, the UE may transmit an explicit request to update the UL CSI or adapt SRS configuration. The request may be based on a configuration that the UE receives from the network node. In another example, the request to update the UL CSI or adapt the SRS configuration may be implicitly indicated to the network node, e.g., without a specific request. The implicit request to update the UL CSI or adapt the SRS configuration may have less latency than the explicit request.

Examples of an implicit request to update the UL CSI or adapt the SRS configuration may include a buffer status report (BSR), a power management maximum power reduction (P-MPR) report, etc. For example, the UE may implicitly request to update the UL CSI or adapt the SRS configuration by configuring at least one of the BSR, the P-MPR report, etc. to induce the update of the UL CSI or adapt SRS configuration. The network node may respond to the BSR, the P-MPR report, etc. received from the UE by configuring the UE with an updated CSI configuration (e.g., for measuring and/or reporting DL CSI) or an updated SRS configuration for the transmission of SRS. However, the configuration of the UL CSI and the SRS are determined by the network node, and the network node may not update the UL CSI configuration or adapt the SRS configuration after receiving the report, or implicit indication, from the UE.

Accordingly, aspects presented herein provide a more proactive way of adapting the UL scheduling and UL CSI acquisition. The accurate UL CSI reporting to a network node in a timely fashion may enable the network node to configure improved scheduling parameters for the UL transmission.

In some aspects, the network node may transmit an UL grant with a subset of UL scheduling information or subset of UL parameters, and may allow the UE to select or determine the remaining UL scheduling information or the remaining UL scheduling information that are not indicated in the UL grant. Here, the UL scheduling information may refer to any form of information, information element, parameter, etc. for configuring the UL transmission for the network node and the UE. The network node may transmit the UL grant, e.g., whether a dynamic grant (DG) indicated in DCI or a configured grant (CG) that is configured and/or activated in RRC signaling and/or via a MAC-CE. The UL grant configured or transmitted by the network node may provide a subset of UL scheduling information (e.g., a subset of parameters associated with UL transmission), and the remaining UL scheduling information (e.g., the remaining parameters associated with UL transmission) that are not configured or indicated in the UL scheduling information of the UL grant may be open for the UE to select. As the UE may have more current or accurate information about the local traffic, UL channel, and/or the conditions experienced at the UE, the UE may select at least one UL scheduling information that are more in line with the current conditions experienced at the UE and the UL channel. Here, the subset of UL grant information may be semi-statically configured (e.g., for CG), or it may be dynamically indicated (e.g., in DCI scheduling an UL transmission).

In one aspect, the subset of UL scheduling information may include at least one of a time domain resource allocation (TDRA) or a frequency domain resource allocation (FDRA) for the UL transmission(s). As an example, the TDRA and the FDRA may indicate the time-frequency resources allocated for the UE to transmit one or more PUSCH transmissions to the network node. In another aspect, the subset of UL scheduling information may also include at least one of a rank indicator (RI), a transmit precoding matrix index (TPMI), a SRS resource indicator (SRI), etc. for the UL transmission.

The UE may select or determine the other UL scheduling information or parameters associated with the UL scheduling that are not indicated in the subset of UL scheduling information in the UL grant, (e.g., a reverse UL scheduling). In one example, the UL grant may indicate the TDRA and FDRA, and the UE may select one or more of the RI, precoding matrix indicator (PMI), modulation and coding scheme (MCS), Tx beam including SRS resource indicator (SRI) or transmission configuration indicator (TCI), Tx power, Tx timing (TA), repetition factor, or frequency hopping, etc.

In one aspect, the UE may select the remaining UL grant information (e.g., the remaining parameters associated with the UL transmission) within a range of values or a set of candidate values. That is, the network may configure for the UE the range or set of candidate values. In one example, the range or the set of candidate values of the UE-selected UL scheduling information may be configured for the network node and the UE. In another example, the network node may configure the range or the set of candidate values of the UE-selected UL scheduling information for the UE.

In another aspect, the network node may indicate to the UE the subset of UL scheduling information or the remaining UL scheduling information for selection by the UE. Based on the indication, the UE may select or determine the remaining UL scheduling information not specified by the subset of UL scheduling information. In one example, the DCI carrying the UL grant may include a set of fields to indicate portion of the UL grant information that are open for, e.g., available for, the UE to select or determine. For example, the network node may include all zero values (or other pre-determined value) in a particular DCI field to indicate that the corresponding UL grant information or parameter for the particular DCI field are not indicated/configured by the network and are intended to be UE-selected UL scheduling information for the UE to select or determine.

In another aspect, the UE may send a recommendation or a suggestion of the UL grant information. That is, the UE may be configured to send a recommendation or suggestion of the subset of UL grant information based on the understanding of the channel status or device condition at the UE. The network node may accept or deny the recommended subset of UL grant information received from the UE.

In some aspects, after the UE may determine some of the UL scheduling information (e.g., the UE-selected UL scheduling information), the UE may indicate the UE-selected UL scheduling information to the network node. The UE may indicate, report, or transmit the UE-selected UL scheduling information to the network in an uplink control information (UCI) to the network node. A dedicated UCI may be configured for the UE to transmit the UE-selected UL scheduling information to the network node. The network node, upon receiving the UCI, may update its scheduling strategy (e.g., outer-loop link adaptation parameter).

The dedicated UCI may be configured for the network node and the UE or configured by the network node for the UE. For example, the size of the UCI may be configured by an RRC signaling or indicated by the DCI (e.g., by a beta offset). The MCS of the UCI may be configured (e.g. RRC configured modulation order and mother code size) for both of the network node and the UE.

In one example, the dedicated UCI may be transmitted on a separate PUCCH. In another example, the dedicated UCI may be multiplexed with other UCIs, if any, such as HARQ-ACK feedback, CSI report, etc. In another example, the dedicated UCI may be piggybacked on the corresponding UL data transmission (e.g., the PUSCH scheduled by the UL grant).

In one aspect, the dedicated UCI carrying the UE-selected UL scheduling information may include other information to help the network node to change its future scheduling strategy. In one example, the UCI carrying the UE-selected UL scheduling information may include a UE's estimation of UL beam/CSI change in the future, a change in power or battery state of the UE, etc.

The dedicated UCI may also include a request for follow-up grants. For example, the UL grant including the TDRA/FDRA may not be large enough to transmit all of the UL data, and the UE may request the follow-up grants. In one example, for the CG, the follow-up grant may be another CG or a DG.

The dedicated UCI may also indicate whether to change the scheduling strategy for the corresponding UL transmission, or for the future UL scheduling. In one example, the dedicated UCI associated with the UL scheduling of the PUSCH may include an indication to change the UL scheduling strategy for the PUSCH, and revert to the original UL scheduling strategy for the future PUSCHs. In another example, the UCI associated with the UL scheduling of the PUSCH may include an indication to change the UL scheduling strategy for the PUSCH and the future PUSCHs.

In some aspects, at least one timeline configuration associated with the UE-selected UL scheduling information may be provided. The at least one timeline configuration may include at least one of an applicable time, an application time, or a processing time. The timeline information may be indicated by the network node along with the UL grant configuration information signaling. In one example, the applicable time may refer to a time duration for which the UL scheduling information determined or recommended by the UE may be valid and usable. In another example, the application time may refer to the time for the UE to apply the UE-selected UL scheduling information in future UL scheduled transmission. In another example, the processing time may refer to the time for the UE to process the UE-selected UL scheduling information.

In one aspect, the applicable time for the UE to determine and recommend UL scheduling information may be configured and indicated along with the UL grant configuration information signaling. The applicable time may indicate the duration for which the indicated parameters are valid and usable for UL transmissions to the network node. That is, the application time may be configured to indicate the time duration that the indicated parameters are valid. The UE may include the applicable time in the UCI and indicate the applicable time to the network node via the UCI.

In another aspect, the application time may be configured to indicate the time duration for applying the UE-selected UL scheduling information in future UL scheduled transmission. For example, the future UL scheduled transmission may be scheduled with a DG. In one example, the application time may be indicated along with the UE recommendation or the suggestion of the UL grant information. In another aspect, the application time may be configured for the network node and the UE. For example, the application time may correspond to the number of slots after which the indicated parameters are to be assumed by UE for UL transmission, and e.g. the UE and the network node may autonomously switch to using the indicated parameters.

In another aspect, the processing time may be configured for the UE to process the UE-selected UL scheduling information. That is, the processing time may refer to the preparation time for the UE to start a scheduled transmission (e.g., PUSCH) after receiving the UL grant, with or without the subset of UL grant information. The processing time for the reverse UL scheduling (based on UE side scheduling parameter info) may be different from the UL scheduling based on network node indicated UL scheduling. In one example, the processing time may be associated with a UE capability and signaled as a UE feature. In another example, the processing time may be a new parameter configured as a function of the SCS configured for the network node and the UE.

Figure 5:
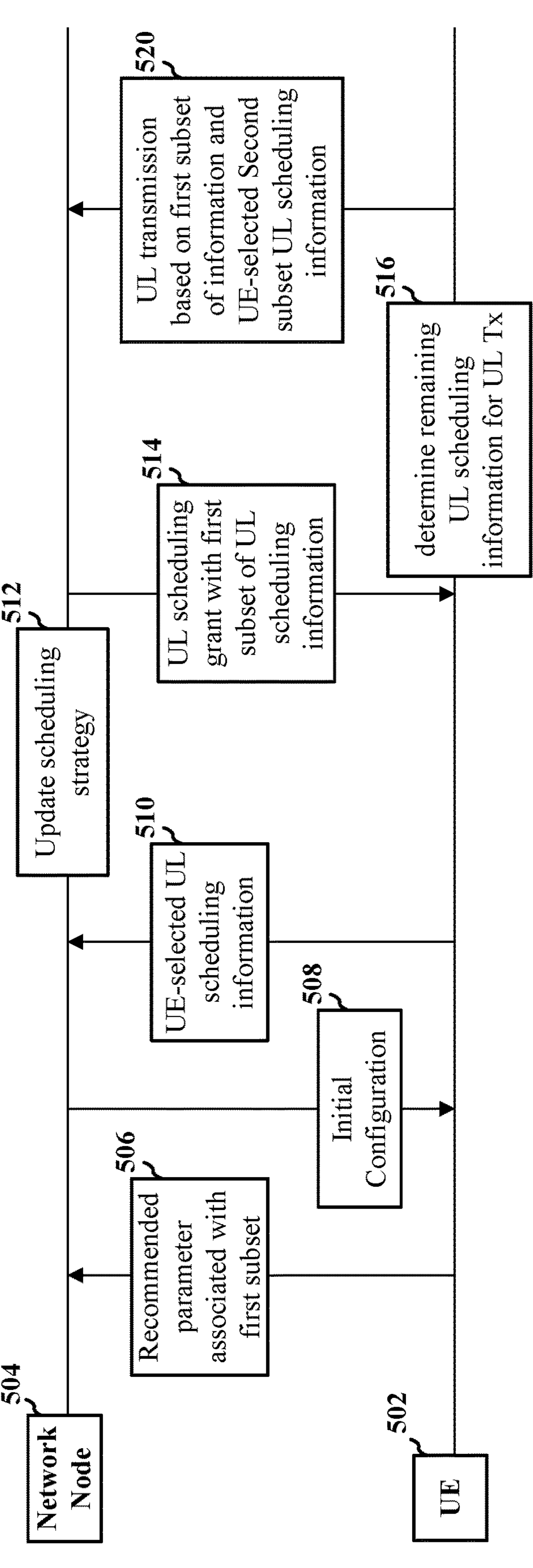
FIG. 5 is a diagram of UL grant configuration of a method of wireless communication.

FIG. 5 is a diagram 500 of UL grant configuration of a method of wireless communication. The diagram 500 may include a UE 502 and a network node 504. The UE 502 and the network node 504 may be configured with at least one UE-selected UL scheduling information of the UL grant information and the UE 502 may select or determine the at least one UE-selected UL scheduling information of the UL grant information based on the understanding of the channel status or device condition at the UE 502. The UE 502 and the network node 504 may have reduced network overhead from reduced signaling and improved network energy efficiency from reduced power consumption.

At 506, the UE 502 may send a recommendation or a suggestion of parameter associated with the UL grant information. That is, the UE 502 may be configured to send the recommendation or the suggestion associated with the subset of UL grant information based on the understanding of the channel status or device condition at the UE 502. The network node 504 may accept or deny the recommended parameter associated with the subset of UL grant information received from the UE 502.

At 508, the network node 504 may transmit an initial configuration of the UL scheduling to the UE 502. In one example, the initial configuration may include an indication for the UE 502 of the subset of UL scheduling information or the UE-selected UL scheduling information. That is, the network node 504 may indicate the UE 502 of the subset of UL scheduling information or the UE-selected UL scheduling information using the initial configuration. In another example, the initial configuration may include a range or a set of candidate values of the UE-selected UL scheduling information configured for the network node 504 and the UE 502. That is, the network node 504 may indicate the range or the set of candidate values of the UE-selected UL scheduling information configured for the network node 504 and the UE 502. The range or the set of candidate values may be configured for each of the UE-selected UL scheduling information, and the UE 502 may select the UE-selected UL scheduling information within the range or the set of candidate values received from the network node 504.

At 510, based on the initial configuration at 508, the UE 502 may determine and transmit the UE-selected UL scheduling information to the network node 504. The UE-selected UL scheduling information may be determined based on the understanding of the channel status or device condition at the UE 502. In one aspect, the UE 502 may identify the UE-selected UL scheduling information based on the indication at 508 that the UE 502 of the subset of UL scheduling information or the UE-selected UL scheduling information. In another aspect, the UE 502 may select the UE-selected UL scheduling information within the range or the set of candidate values received from the network node 504 at 508.

The UE-selected UL scheduling information may be transmitted to the network node 504 in a dedicated UCI. The dedicated UCI may be configured for the network node 504 and the UE 502 or configured by the network node 504 for the UE 502. For example, the size of the UCI may be configured by an RRC signaling or indicated by the DCI (e.g., by a beta offset). The MCS of the UCI may be configured (e.g. RRC configured modulation order and mother code size) for both of the network node and the UE. In one example, the dedicated UCI may be transmitted on a separate PUCCH. In another example, the dedicated UCI may be multiplexed with other UCIs, if any, such as HARQ-ACK feedback, CSI report, etc. In another example, the dedicated UCI may be piggybacked on the corresponding UL data transmission (e.g., the PUSCH scheduled by the UL grant).

In one aspect, the dedicated UCI carrying the UE-selected UL scheduling information may include other information to help the network node 504 to change its future scheduling strategy. In one example, the UCI carrying the UE-selected UL scheduling information may include a UE's estimation of UL beam/CSI change in the future, a change in power or battery state of the UE, etc.

The dedicated UCI may also include a request for follow-up grants. For example, the UL grant including the TDRA/FDRA may not be large enough to transmit all of the UL data, and the UE 502 may request the follow-up grants. In one example, for the CG, the follow-up grant may be another CG or a DG.

The dedicated UCI may also indicate whether to change the scheduling strategy for the corresponding UL transmission, or for the future UL scheduling. In one example, the dedicated UCI associated with the UL scheduling of the PUSCH may include an indication to change the UL scheduling strategy for the PUSCH, and revert to the original UL scheduling strategy for the future PUSCHs. In another example, the UCI associated with the UL scheduling of the PUSCH may include an indication to change the UL scheduling strategy for the PUSCH and the future PUSCHs.

In some aspects, at least one timeline configuration associated with the UE-selected UL scheduling information may be provided. The at least one timeline configuration may include at least one of an applicable time, an application time, or a processing time. The applicable time may refer to a time duration for which the UL scheduling information determined or recommended by the UE 502 may be valid and usable, the application time may refer to the time for the UE 502 to apply the UE-selected UL scheduling information in future UL scheduled transmission, and the processing time may refer to the time for the UE 502 to process the UE-selected UL scheduling information.

In one aspect, the applicable time for the UE 502 to determine and recommend UL scheduling information may be configured and indicated along with the UL grant configuration information signaling. The applicable time may indicate the duration for which the indicated UE-selected UL scheduling information are valid and usable for the network node 504. That is, the applicable time may be configured to indicate the time duration that the indicated UE-selected UL scheduling information are valid. The UE 502 may include the applicable time in the UCI and indicate the applicable time to the network node 504 via the UCI.

In another aspect, the application time may be configured to indicate the time duration for applying the UE-selected UL scheduling information in future UL scheduled transmission. For example, the future UL scheduled transmission may be DG. In one example, the application time may be indicated along with the UE 502 recommendation or the suggestion of the UL grant information. In another aspect, the application time may be configured for the network node 504 and the UE 502. For example, the application time may determine the number of slots after which the indicated UE-selected UL scheduling information would be assumed by UE 502 for UL transmission, and e.g. the UE 502 and the network node 504 may autonomously switch to using the indicated UE-selected UL scheduling information.

In another aspect, the processing time may be configured for the UE 502 to process the UE-selected UL scheduling information. That is, the processing time may refer to the preparation time for the UE 502 to start a scheduled transmission after receiving the UL grant, with or without the subset of UL grant information. The processing time for the reverse UL scheduling (based on UE side scheduling parameter info) may be different from the UL scheduling based on network node indicated UL scheduling. In one example, the processing time may be associated with a UE 502 capability and signaled as a UE 502 feature. In another example, the processing time may be a new parameter configured as a function of the SCS configured for the network node 504 and the UE 502.

At 512, the network node 504 may update the UL scheduling strategy. That is, the network node 504 may update the UL scheduling strategy based on the recommendation or the suggestion of the subset of UL grant information received from the UE 502 at 506 and the UE-selected UL scheduling information may be determined at 510 based on the understanding of the channel status or device condition at the UE 502. Here, the network node 504 may configure the UL scheduling strategy based on the based on the understanding of the channel status or device condition at the UE 502.

At 514, based on the UL scheduling strategy at 512, the network node 504 may transmit the UL grant with a subset of UL scheduling information to the UE 502. In one example, the subset of UL scheduling information may correspond with the indication for the UE 502 of the subset of UL scheduling information or the UE-selected UL scheduling information. In another example, the subset of UL scheduling information in the UL scheduling grant may be different that the subset of UL scheduling information or the UE-selected UL scheduling information indicated at 508.

At 516, The UE 502 may determine the UE-selected UL scheduling information. The UE-selected UL scheduling information may be the remaining UL scheduling information of the UL grant information other than the subset of UL scheduling information received at 514. The UE-selected UL scheduling information may be determined based on the understanding of the channel status or device condition at the UE 502. The UE 502 may select or determine the UE-selected UL scheduling information within the range or the set of candidate values configured for the corresponding UL grant information. In one example, the range or the set of candidate values may be configured for the network node 504 and the UE 502. In another example, the range or the set of candidate values may be configured by the initial configuration at 508.

At 520, The UE 502 may transmit the UL transmission (e.g., the PUSCH) based on the subset of information received at 514 and the UE-selected UL scheduling information selected at 516. The UE 502 may transmit the UL transmission (e.g., the PUSCH) based on the UE-selected UL scheduling information, and the UL transmission may have reduced network overhead from reduced signaling and improved network energy efficiency from reduced power consumption.

Figure 6:
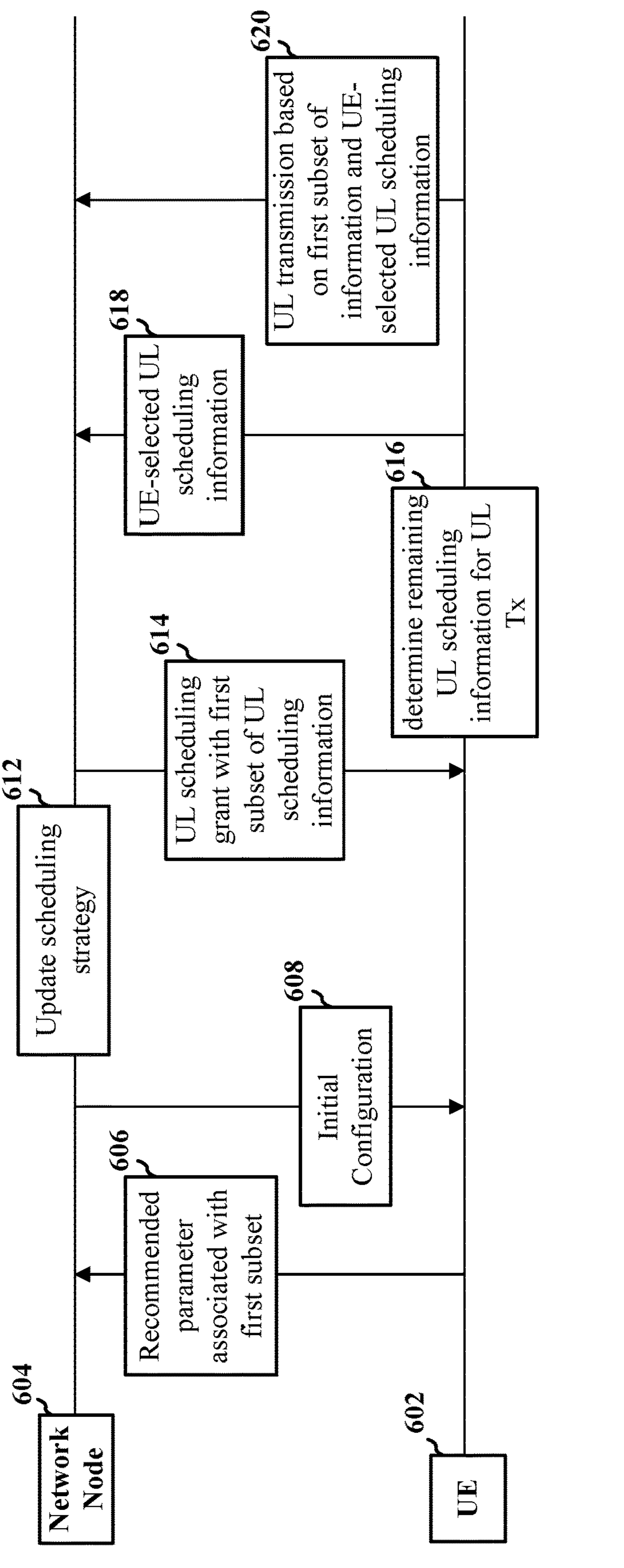
FIG. 6 is a diagram of UL grant configuration of a method of wireless communication.

FIG. 6 is a diagram 600 of UL grant configuration of a method of wireless communication. The diagram 600 may include a UE 602 and a network node 604. The UE 602 and the network node 604 may be configured with at least one UE-selected UL scheduling information of the UL grant information and the UE 602 may select or determine the at least one UE-selected UL scheduling information of the UL grant information based on the understanding of the channel status or device condition at the UE 602. The UE 602 and the network node 604 may have reduced network overhead from reduced signaling and improved network energy efficiency from reduced power consumption.

At 606, the UE 602 may send a recommendation or a suggestion of parameter associated with the UL grant information. That is, the UE 602 may be configured to send the recommendation or the suggestion associated with the subset of UL grant information based on the understanding of the channel status or device condition at the UE 602. The network node 604 may accept or deny the recommended parameter associated with the subset of UL grant information received from the UE 602.

At 608, the network node 604 may transmit an initial configuration of the UL scheduling to the UE 602. In one example, the initial configuration may include an indication for the UE 602 of the subset of UL scheduling information or the UE-selected UL scheduling information. That is, the network node 604 may indicate the UE 602 of the subset of UL scheduling information or the UE-selected UL scheduling information using the initial configuration. In another example, the initial configuration may include a range or a set of candidate values of the UE-selected UL scheduling information configured for the network node 604 and the UE 602. That is, the network node 604 may indicate the range or the set of candidate values of the UE-selected UL scheduling information configured for the network node 604 and the UE 602. The range or the set of candidate values may be configured for each of the UE-selected UL scheduling information, and the UE 602 may select the UE-selected UL scheduling information within the range or the set of candidate values received from the network node 604.

At 612, the network node 604 may update the UL scheduling strategy. That is, the network node 604 may update the UL scheduling strategy based on the recommendation or the suggestion of the subset of UL grant information received from the UE 602 at 606 based on the understanding of the channel status or device condition at the UE 602. Here, the network node 604 may configure the UL scheduling strategy based on the based on the understanding of the channel status or device condition at the UE 602.

At 614, based on the UL scheduling strategy at 612, the network node 604 may transmit the UL grant with a subset of UL scheduling information to the UE 602. In one example, the subset of UL scheduling information may correspond with the indication for the UE 602 of the subset of UL scheduling information or the UE-selected UL scheduling information. In another example, the subset of UL scheduling information in the UL scheduling grant may be different that the subset of UL scheduling information or the UE-selected UL scheduling information indicated at 608.

At 616, The UE 602 may determine the UE-selected UL scheduling information. The UE-selected UL scheduling information may be the remaining UL scheduling information of the UL grant information other than the subset of UL scheduling information received at 614. The UE-selected UL scheduling information may be determined based on the understanding of the channel status or device condition at the UE 602. The UE 602 may select or determine the UE-selected UL scheduling information within the range or the set of candidate values configured for the corresponding UL grant information. In one example, the range or the set of candidate values may be configured for the network node 604 and the UE 602. In another example, the range or the set of candidate values may be configured by the initial configuration at 608.

At 618, based on the initial configuration at 608, the UE 602 may transmit the UE-selected UL scheduling information determined at 616 to the network node 604. In one aspect, the UE 602 may identify the UE-selected UL scheduling information based on the indication at 608 that the UE 602 of the subset of UL scheduling information or the UE-selected UL scheduling information. In another aspect, the UE 602 may select the UE-selected UL scheduling information within the range or the set of candidate values received from the network node 604 at 608.

The UE-selected UL scheduling information may be transmitted to the network node 604 in a dedicated UCI. The dedicated UCI may be configured for the network node 604 and the UE 602 or configured by the network node 604 for the UE 602. For example, the size of the UCI may be configured by an RRC signaling or indicated by the DCI (e.g., by a beta offset). The MCS of the UCI may be configured (e.g. RRC configured modulation order and mother code size) for both of the network node and the UE. In one example, the dedicated UCI may be transmitted on a separate PUCCH. In another example, the dedicated UCI may be multiplexed with other UCIs, if any, such as HARQ-ACK feedback, CSI report, etc. In another example, the dedicated UCI may be piggybacked on the corresponding UL data transmission (e.g., the PUSCH scheduled by the UL grant).

In one aspect, the dedicated UCI carrying the UE-selected UL scheduling information may include other information to help the network node 604 to change its future scheduling strategy. In one example, the UCI carrying the UE-selected UL scheduling information may include a UE's estimation of UL beam/CSI change in the future, a change in power or battery state of the UE, etc.

The dedicated UCI may also include a request for follow-up grants. For example, the UL grant including the TDRA/FDRA may not be large enough to transmit all of the UL data, and the UE 602 may request the follow-up grants. In one example, for the CG, the follow-up grant may be another CG or a DG.

The dedicated UCI may also indicate whether to change the scheduling strategy for the corresponding UL transmission, or for the future UL scheduling. In one example, the dedicated UCI associated with the UL scheduling of the PUSCH may include an indication to change the UL scheduling strategy for the PUSCH, and revert to the original UL scheduling strategy for the future PUSCHs. In another example, the UCI associated with the UL scheduling of the PUSCH may include an indication to change the UL scheduling strategy for the PUSCH and the future PUSCHs.

In some aspects, at least one timeline configuration associated with the UE-selected UL scheduling information may be provided. The at least one timeline configuration may include at least one of an applicable time, an application time, or a processing time. The applicable time may refer to a time duration for which the UL scheduling information determined or recommended by the UE 602 may be valid and usable, the application time may refer to the time for the UE 602 to apply the UE-selected UL scheduling information in future UL scheduled transmission, and the processing time may refer to the time for the UE 602 to process the UE-selected UL scheduling information.

In one aspect, the applicable time for the UE 602 to determine and recommend UL scheduling information may be configured and indicated along with the UL grant configuration information signaling. The applicable time may indicate the duration for which the indicated UE-selected UL scheduling information are valid and usable for the network node 604. That is, the applicable time may be configured to indicate the time duration that the indicated UE-selected UL scheduling information are valid. The UE 602 may include the applicable time in the UCI and indicate the applicable time to the network node 604 via the UCI.

In another aspect, the application time may be configured to indicate the time duration for applying the UE-selected UL scheduling information in future UL scheduled transmission. For example, the future UL scheduled transmission may be DG. In one example, the application time may be indicated along with the UE 602 recommendation or the suggestion of the UL grant information. In another aspect, the application time may be configured for the network node 604 and the UE 602. For example, the application time may determine the number of slots after which the indicated UE-selected UL scheduling information would be assumed by UE 602 for UL transmission, and e.g. the UE 602 and the network node 604 may autonomously switch to using the indicated UE-selected UL scheduling information.

In another aspect, the processing time may be configured for the UE 602 to process the UE-selected UL scheduling information. That is, the processing time may refer to the preparation time for the UE 602 to start a scheduled transmission after receiving the UL grant, with or without the subset of UL grant information. The processing time for the reverse UL scheduling (based on UE side UL scheduling information) may be different from the UL scheduling based on network node indicated UL scheduling. In one example, the processing time may be associated with a UE 602 capability and signaled as a UE 602 feature. In another example, the processing time may be a new parameter configured as a function of the SCS configured for the network node 604 and the UE 602.

At 620, The UE 602 may transmit the UL transmission (e.g., the PUSCH) based on the subset of information received at 614 and the UE-selected UL scheduling information selected at 616. The UE 602 may transmit the UL transmission (e.g., the PUSCH) based on the UE-selected UL scheduling information, and the UL transmission may have reduced network overhead from reduced signaling and improved network energy efficiency from reduced power consumption.

Figure 7:
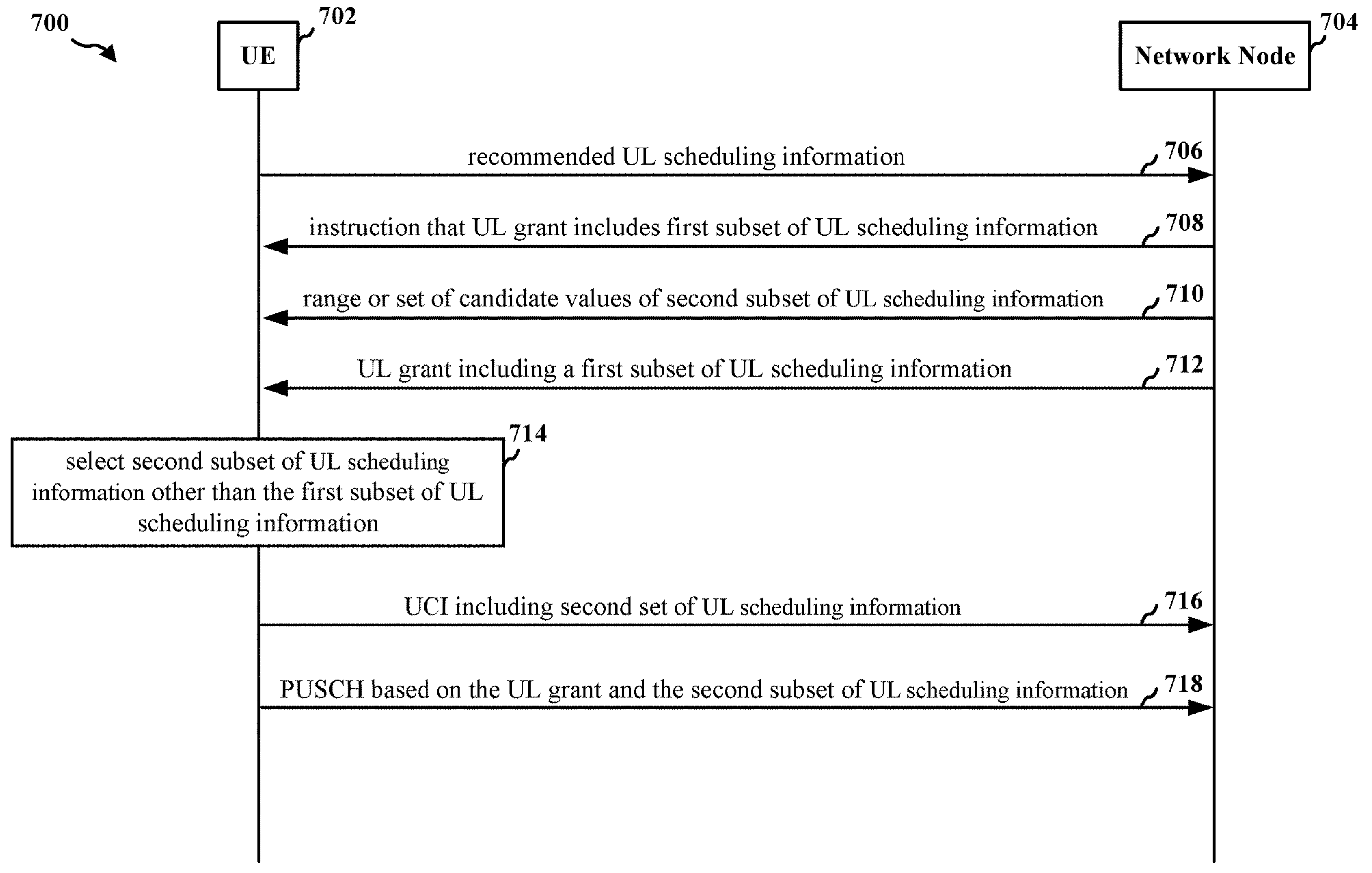
FIG. 7 is a call-flow diagram of a method of wireless communication.

FIG. 7 is a call-flow diagram 700 of a method of wireless communication. The call-flow diagram 700 may include a UE 702 and a network node 704. When scheduling UL grant for the UE 702, the network node 704 may allow the UE 702 to configure a second subset of UL scheduling information including at least one UE-selected UL scheduling information of the UL grant information and transmit the PUSCH based on the UL grant information including the at least one UE-selected UL scheduling information. The network node 704 may transmit the UL grant including a first subset of UL scheduling information to the UE 702, and the UE 702 may select or determine the at least one UE-selected UL scheduling information of the UL grant information. The UE 702 may select or determine the at least one UE-selected UL scheduling information of the UL grant information based on the understanding of the channel status or device condition at the UE 702.

At 706, the UE 702 may transmit a recommended parameter associated with the first subset of UL scheduling information among the plurality of UL scheduling information associated with the PUSCH. The network node 704 may receive a recommended parameter associated with the first subset of UL scheduling information among the plurality of UL scheduling information associated with the PUSCH.

Here, the UE 702 may be configured to send the recommendation or the suggestion of the first subset of UL grant information based on the understanding of the channel status or device condition at the UE 702. The network node 704 may accept or deny the recommended first subset of UL grant information received from the UE 702.

At 708, the network node 704 may transmit an instruction indicating that the UL grant includes the first subset of UL scheduling information among the plurality of UL scheduling information associated with the PUSCH. The UE 702 may receive an instruction indicating that the UL grant includes the first subset of UL scheduling information among the plurality of UL scheduling information associated with the PUSCH. Here, the indication that the UL grant includes the first subset of UL scheduling information may be transmitted from the network node 704 to the UE 702 as a part of an initial configuration of the UL scheduling to the UE 702. That is, the network node 704 may indicate the UE 702 of the first subset of UL scheduling information or the UE-selected UL scheduling information using the initial configuration.

At 710, the network node 704 may transmit a range or a set of candidate values of a corresponding UL scheduling information for the UE 702 to select the second subset of UL scheduling information. The UE 702 may receive the range or the set of candidate values of the corresponding UL scheduling information. Here, the range or a set of candidate values of a corresponding UE-selected UL scheduling information may be transmitted from the network node 704 to the UE 702 as a part of an initial configuration of the UL scheduling to the UE 702. That is, the network node 704 may indicate the range or the set of candidate values of the UE-selected UL scheduling information configured for the network node 704 and the UE 702. The range or the set of candidate values may be configured for each of the UE-selected UL scheduling information, and the UE 702 may select the UE-selected UL scheduling information within the range or the set of candidate values received from the network node 704.

At 712, the network node 704 may transmit an UL grant to a UE 702, the UL grant including a first subset of UL scheduling information among a plurality of UL scheduling information associated with a PUSCH. The UE 702 may receive an UL grant from a network node 704, the UL grant including a first subset of UL scheduling information among a plurality of UL scheduling information associated with a PUSCH. In one example, the first subset of UL scheduling information may correspond with the recommended parameter associated with the first subset of UL scheduling information among the plurality of UL scheduling information associated with the PUSCH at 706. In another example, the first subset of UL scheduling information in the UL scheduling grant may be different that the first subset of UL scheduling information or the UE-selected UL scheduling information indicated at 710. Here, the UL grant may be received semi-statically or dynamically. In one aspect, the first subset of UL scheduling information may include at least one of a TDRA or a FDRA associated with the PUSCH. The first subset of UL scheduling information may further include at least one of a RI, a TPMI, or a SRI.

At 714, the UE 702 may select a second subset of UL scheduling information (e.g., the UE-selected UL scheduling information) of second subset of UL scheduling information from the plurality of UL scheduling information other than the first subset of UL scheduling information. Here, the second subset of UL scheduling information may be selected or determined based on second subset of UL scheduling information. In one aspect, the second subset of UL scheduling information to be selected at the UE 702 may include at least one of RI, PMI, MCS, Tx beam including SRI or TCI, Tx power, TA, repetition factor, or frequency hopping.

In another aspect, the second subset of UL scheduling information may be selected within a range or a set of candidate values of corresponding UL scheduling information. That is, the UE 702 may select the second subset of UL scheduling information from the range or the set of candidate values configured for the network node 704 and the UE 702 or by the network node 704 at 710.

At 716, the UE 702 may transmit an UCI including the second subset of UL scheduling information of the plurality of UL scheduling information other than the first subset of UL scheduling information to the network node 704. The network node 704 may receive an UCI from the UE 702, the UCI including second subset of UL scheduling information of the plurality of UL scheduling information other than the first subset of UL scheduling information.

The UE-selected UL scheduling information may be transmitted to the network node 704 in a dedicated UCI. The dedicated UCI may be configured for the network node 704 and the UE 702 or configured by the network node 704 for the UE 702. For example, the size of the UCI may be configured by an RRC signaling or indicated by the DCI (e.g., by a beta offset). The MCS of the UCI may be configured (e.g. RRC configured modulation order and mother code size) for both of the network node and the UE. The UCI may be transmitted via at least one of a PUCCH or the PUSCH. In one example, the dedicated UCI may be transmitted on a separate PUCCH. In another example, the dedicated UCI may be multiplexed with other UCIs, if any, such as HARQ-ACK feedback, CSI report, etc. In another example, the dedicated UCI may be piggybacked on the corresponding UL data transmission (e.g., the PUSCH scheduled by the UL grant).

In one aspect, the dedicated UCI carrying the UE-selected UL scheduling information may include other information to help the network node 704 to change its future scheduling strategy. For example, the UCI may further include at least one of a prediction of an UL beam or CSI at the UE 702, a change in power or battery state of the UE 702, or a request for a follow-up UL grant.

The dedicated UCI may also include a request for follow-up grants. For example, the UL grant including the TDRA/FDRA may not be large enough to transmit all of the UL data, and the UE 702 may request the follow-up grants. In one example, for the CG, the follow-up grant may be another CG or a DG.

The dedicated UCI may also indicate whether to change the scheduling strategy for the corresponding UL transmission, or for the future UL scheduling. In one example, the dedicated UCI associated with the UL scheduling of the PUSCH may include an indication to change the UL scheduling strategy for the PUSCH, and revert to the original UL scheduling strategy for the future PUSCHs. In another example, the UCI associated with the UL scheduling of the PUSCH may include an indication to change the UL scheduling strategy for the PUSCH and the future PUSCHs.

In some aspects, at least one timeline configuration associated with the UE-selected UL scheduling information may be provided. The at least one timeline configuration may include at least one of an applicable time, an application time, or a processing time. The applicable time may refer to a time duration for which the UL scheduling information determined or recommended by the UE 702 may be valid and usable, the application time may refer to the time for the UE 702 to apply the UE-selected UL scheduling information in future UL scheduled transmission, and the processing time may refer to the time for the UE 702 to process the UE-selected UL scheduling information.

In one aspect, the applicable time for the UE 702 to determine and recommend UL scheduling information may be configured and indicated along with the UL grant configuration information signaling. The applicable time may indicate the duration for which the indicated UE-selected UL scheduling information are valid and usable for the network node 704. That is, the applicable time may be configured to indicate the time duration that the indicated UE-selected UL scheduling information are valid. The UE 702 may include the applicable time in the UCI and indicate the applicable time to the network node 704 via the UCI.

In another aspect, the application time may be configured to indicate the time duration for applying the UE-selected UL scheduling information in future UL scheduled transmission. For example, the future UL scheduled transmission may be DG. In one example, the application time may be indicated along with the UE 702 recommendation or the suggestion of the UL grant information. In another aspect, the application time may be configured for the network node 704 and the UE 702. For example, the application time may determine the number of slots after which the indicated UE-selected UL scheduling information would be assumed by UE 702 for UL transmission, and e.g. the UE 702 and the network node 704 may autonomously switch to using the indicated UE-selected UL scheduling information.

In another aspect, the processing time may be configured for the UE 702 to process the UE-selected UL scheduling information. That is, the processing time may refer to the preparation time for the UE 702 to start a scheduled transmission after receiving the UL grant, with or without the first subset of UL grant information. The processing time for the reverse UL scheduling (based on UE side scheduling UL scheduling information) may be different from the UL scheduling based on network node indicated UL scheduling. In one example, the processing time may be associated with a UE 702 capability and signaled as a UE 702 feature. In another example, the processing time may be a new parameter configured as a function of the SCS configured for the network node 704 and the UE 702.

At 718, the UE 702 may transmit the PUSCH to the network node 704 based on the first subset of UL scheduling information and the second subset of UL scheduling information. The network node 704 may receive the PUSCH from the UE 702 based on the first subset of UL scheduling information and the second subset of UL scheduling information. The UE 702 may transmit the UL transmission (e.g., the PUSCH) based on the UE-selected UL scheduling information, and the UL transmission may have reduced network overhead from reduced signaling and improved network energy efficiency from reduced power consumption.

Figure 8:
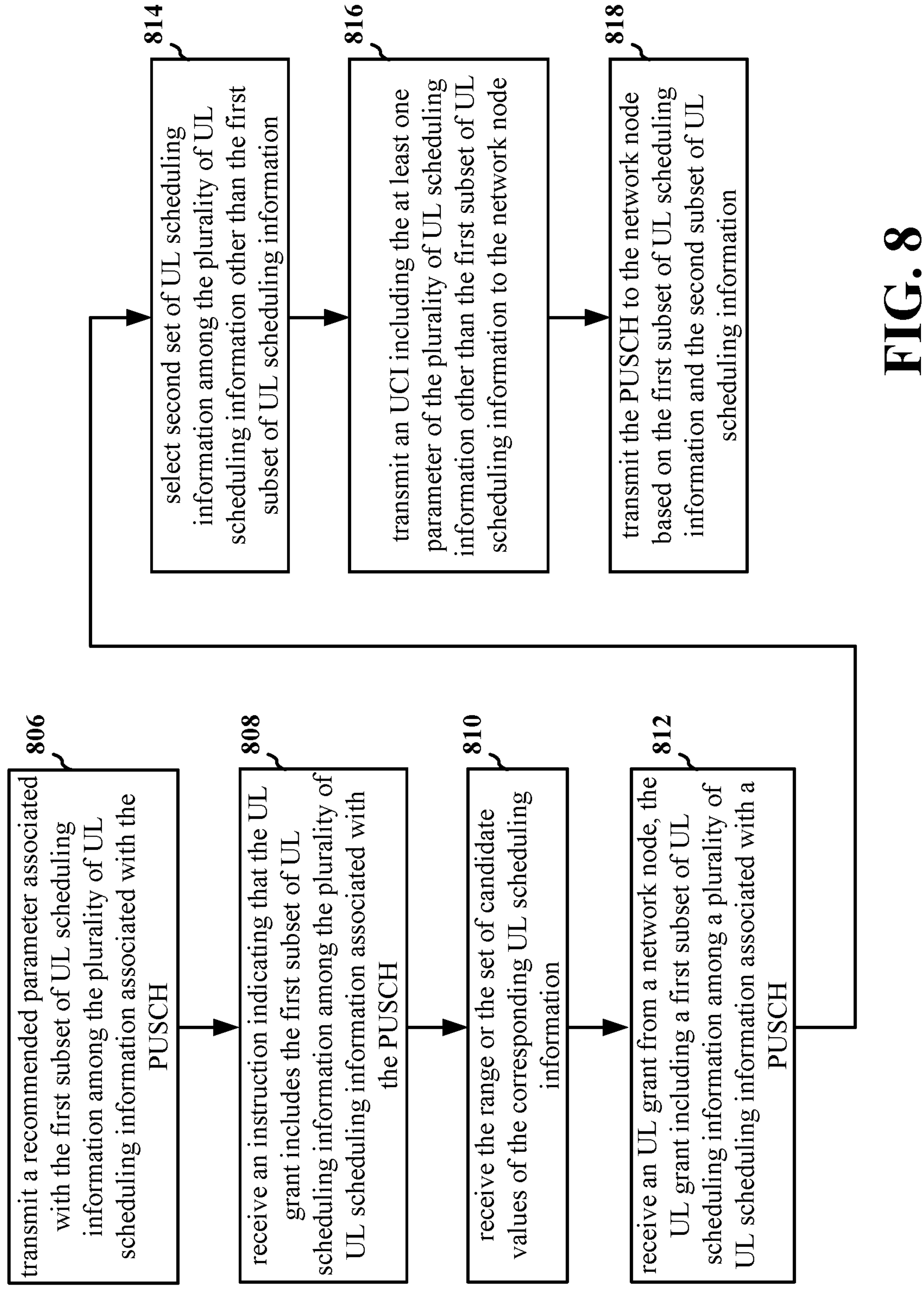
FIG. 8 is a flowchart of a method of wireless communication.

FIG. 8 is a flowchart 800 of a method of wireless communication. The method may be performed by a UE (e.g., the UE 104/402/502/602/702; the apparatus 1204). A network node may allow the UE to configure a second subset of UL scheduling information including at least one UE-selected UL scheduling information of UL grant information and transmit the PUSCH based on the UL grant information including the at least one UE-selected UL scheduling information. The network node may transmit the UL grant including a first subset of UL scheduling information to the UE, and the UE may select or determine the at least one UE-selected UL scheduling information of the UL grant information. The UE may select or determine the at least one UE-selected UL scheduling information of the UL grant information based on the understanding of the channel status or device condition at the UE.

At 806, the UE may transmit a recommended parameter associated with the first subset of UL scheduling information among the plurality of UL scheduling information associated with the PUSCH. Here, the UE may be configured to send the recommendation or the suggestion of the first subset of UL grant information based on the understanding of the channel status or device condition at the UE. The network node may accept or deny the recommended first subset of UL grant information received from the UE. For example, at 706, the UE 702 may transmit a recommended parameter associated with the first subset of UL scheduling information among the plurality of UL scheduling information associated with the PUSCH. Furthermore, 806 may be performed by a UL grant configuring component 198.

At 808, the UE may receive an instruction indicating that the UL grant includes the first subset of UL scheduling information among the plurality of UL scheduling information associated with the PUSCH. Here, the indication that the UL grant includes the first subset of UL scheduling information may be transmitted from the network node to the UE as a part of an initial configuration of the UL scheduling to the UE. That is, the network node may indicate the UE of the first subset of UL scheduling information or the UE-selected UL scheduling information using the initial configuration. For example, at 708, the UE 702 may receive an instruction indicating that the UL grant includes the first subset of UL scheduling information among the plurality of UL scheduling information associated with the PUSCH. Furthermore, 808 may be performed by the UL grant configuring component 198.

At 810, the UE may receive the range or the set of candidate values of the corresponding UL scheduling information. Here, the range or a set of candidate values of a corresponding UE-selected UL scheduling information may be transmitted from the network node to the UE as a part of an initial configuration of the UL scheduling to the UE. That is, the network node may indicate the range or the set of candidate values of the UE-selected UL scheduling information configured for the network node and the UE. The range or the set of candidate values may be configured for each of the UE-selected UL scheduling information, and the UE may select the UE-selected UL scheduling information within the range or the set of candidate values received from the network node. For example, at 710, the UE 702 may receive the range or the set of candidate values of the corresponding UL scheduling information. Furthermore, 810 may be performed by the UL grant configuring component 198.

At 812, the UE may receive an UL grant from a network node, the UL grant including a first subset of UL scheduling information among a plurality of UL scheduling information associated with a PUSCH. In one example, the first subset of UL scheduling information may correspond with the recommended parameter associated with the first subset of UL scheduling information among the plurality of UL scheduling information associated with the PUSCH at 806. In another example, the first subset of UL scheduling information in the UL scheduling grant may be different that the first subset of UL scheduling information or the UE-selected UL scheduling information indicated at 810. Here, the UL grant may be received semi-statically or dynamically. In one aspect, the first subset of UL scheduling information may include at least one of a TDRA or a FDRA associated with the PUSCH. The first subset of UL scheduling information may further include at least one of a RI, a TPMI, or a SRI. For example, at 712, the UE 702 may receive an UL grant from a network node 704, the UL grant including a first subset of UL scheduling information among a plurality of UL scheduling information associated with a PUSCH. Furthermore, 812 may be performed by the UL grant configuring component 198.

At 814, the UE may select a second subset of UL scheduling information (e.g., the UE-selected UL scheduling information UL scheduling information) of second subset of UL scheduling information among the plurality of UL scheduling information other than the first subset of UL scheduling information. Here, the second subset of UL scheduling information of second subset of UL scheduling information may be selected or determined based on the second subset of UL scheduling information. In one aspect, the second subset of UL scheduling information that is to be selected at the UE may include at least one of RI, PMI, MCS, Tx beam including SRI or TCI, Tx power, TA, repetition factor, or frequency hopping. In another aspect, the second subset of UL scheduling information may be selected within a range or a set of candidate values of corresponding UL scheduling information. That is, the UE may select the second subset of UL scheduling information from the range or the set of candidates values configured for the network node and the UE or by the network node at 810. For example, at 714, the UE 702 may select a second subset of UL scheduling information (e.g., the UE-selected UL scheduling information) of second subset of UL scheduling information among the plurality of UL scheduling information other than the first subset of UL scheduling information. Furthermore, 814 may be performed by the UL grant configuring component 198.

At 816, the UE may transmit an UCI including the second subset of UL scheduling information of the plurality of UL scheduling information other than the first subset of UL scheduling information to the network node. For example, at 716, the UE 702 may transmit an UCI including the second subset of UL scheduling information of the plurality of UL scheduling information other than the first subset of UL scheduling information to the network node 704. Furthermore, 816 may be performed by a UL grant configuring component 198.

The UE-selected UL scheduling information may be transmitted to the network node in a dedicated UCI. The dedicated UCI may be configured for the network node and the UE or configured by the network node for the UE. For example, the size of the UCI may be configured by an RRC signaling or indicated by the DCI (e.g., by a beta offset). The MCS of the UCI may be configured (e.g. RRC configured modulation order and mother code size) for both of the network node and the UE. The UCI may be transmitted via at least one of a PUCCH or the PUSCH. In one example, the dedicated UCI may be transmitted on a separate PUCCH. In another example, the dedicated UCI may be multiplexed with other UCIs, if any, such as HARQ-ACK feedback, CSI report, etc. In another example, the dedicated UCI may be piggybacked on the corresponding UL data transmission (e.g., the PUSCH scheduled by the UL grant).

In one aspect, the dedicated UCI carrying the UE-selected UL scheduling information may include other information to help the network node to change its future scheduling strategy. For example, the UCI may further include at least one of a prediction of an UL beam or CSI at the UE, a change in power or battery state of the UE, or a request for a follow-up UL grant.

The dedicated UCI may also include a request for follow-up grants. For example, the UL grant including the TDRA/FDRA may not be large enough to transmit all of the UL data, and the UE may request the follow-up grants. In one example, for the CG, the follow-up grant may be another CG or a DG.

The dedicated UCI may also indicate whether to change the scheduling strategy for the corresponding UL transmission, or for the future UL scheduling. In one example, the dedicated UCI associated with the UL scheduling of the PUSCH may include an indication to change the UL scheduling strategy for the PUSCH, and revert to the original UL scheduling strategy for the future PUSCHs. In another example, the UCI associated with the UL scheduling of the PUSCH may include an indication to change the UL scheduling strategy for the PUSCH and the future PUSCHs.

In some aspects, at least one timeline configuration associated with the UE-selected UL scheduling information may be provided. The at least one timeline configuration may include at least one of an applicable time, an application time, or a processing time. The applicable time may refer to a time duration for which the UL scheduling information determined or recommended by the UE may be valid and usable, an application time may refer to the time for the UE to apply the UE-selected UL scheduling information in future UL scheduled transmission, and the processing time may refer to the time for the UE to process the UE-selected UL scheduling information.

In one aspect, the applicable time for the UE to determine and recommend UL scheduling information may be configured and indicated along with the UL grant configuration information signaling. The applicable time may indicate the duration for which the indicated parameters are valid and usable for the network node. That is, the applicable time may be configured to indicate the time duration that the indicated parameters are valid. The UE may include the applicable time in the UCI and indicate the applicable time to the network node via the UCI.

In another aspect, the application time may be configured to indicate the time duration for applying the UE-selected UL scheduling information in future UL scheduled transmission. For example, the future UL scheduled transmission may be DG. In one example, the application time may be indicated along with the UE recommendation or the suggestion of the UL grant information. In another aspect, the application time may be configured for the network node and the UE. For example, the application time may determine the number of slots after which the indicated parameters would be assumed by UE for UL transmission, and e.g. the UE and the network node may autonomously switch to using the indicated parameters.

In another aspect, the processing time may be configured for the UE to process the UE-selected UL scheduling information. That is, the processing time may refer to the preparation time for the UE to start a scheduled transmission after receiving the UL grant, with or without the first subset of UL grant information. The processing time for the reverse UL scheduling (based on UE side scheduling parameter info) may be different from the UL scheduling based on network node indicated UL scheduling. In one example, the processing time may be associated with a UE capability and signaled as a UE feature. In another example, the processing time may be a new parameter configured as a function of the SCS configured for the network node and the UE.

At 818, the UE may transmit the PUSCH to the network node based on the first subset of UL scheduling information and the second subset of UL scheduling information. The UE may transmit the UL transmission (e.g., the PUSCH) based on the UE-selected UL scheduling information, and the UL transmission may have reduced network overhead from reduced signaling and improved network energy efficiency from reduced power consumption. For example, at 718, the UE 702 may transmit the PUSCH to the network node 704 based on the first subset of UL scheduling information and the second subset of UL scheduling information. Furthermore, 818 may be performed by the UL grant configuring component 198.

Figure 9:
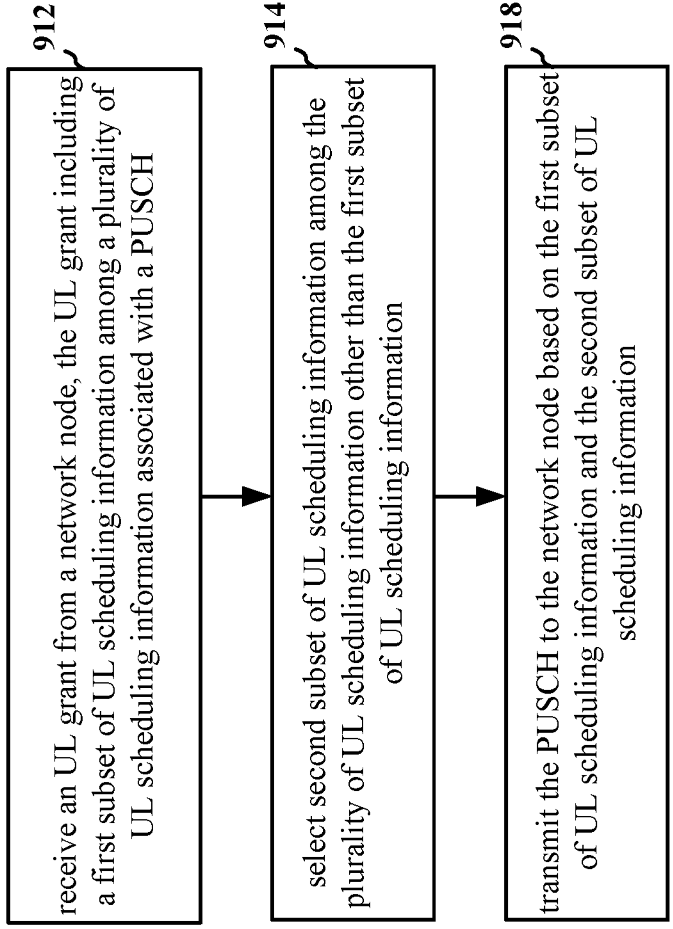
FIG. 9 is a flowchart of a method of wireless communication.

FIG. 9 is a flowchart 900 of a method of wireless communication. The method may be performed by a UE (e.g., the UE 104/402/502/602/702; the apparatus 1204). A network node may allow the UE to configure a second subset of UL scheduling information including at least one UE-selected UL scheduling information of UL grant information and transmit the PUSCH based on the UL grant information including the at least one UE-selected UL scheduling information. The network node may transmit the UL grant including a first subset of UL scheduling information to the UE, and the UE may select or determine the at least one UE-selected UL scheduling information of the UL grant information. The UE may select or determine the at least one UE-selected UL scheduling information of the UL grant information based on the understanding of the channel status or device condition at the UE.

At 912, the UE may receive an UL grant from a network node, the UL grant including a first subset of UL scheduling information among a plurality of UL scheduling information associated with a PUSCH. In one example, the first subset of UL scheduling information may correspond with the recommended parameter associated with the first subset of UL scheduling information among the plurality of UL scheduling information associated with the PUSCH. In another example, the first subset of UL scheduling information in the UL scheduling grant may be different that the first subset of UL scheduling information or the UE-selected UL scheduling information indicated. Here, the UL grant may be received semi-statically or dynamically. In one aspect, the first subset of UL scheduling information may include at least one of a TDRA or a FDRA associated with the PUSCH.

The first subset of UL scheduling information may further include at least one of a RI, a TPMI, or a SRI. For example, at 712, the UE 702 may receive an UL grant from a network node 704, the UL grant including a first subset of UL scheduling information among a plurality of UL scheduling information associated with a PUSCH. Furthermore, 912 may be performed by the UL grant configuring component 198.

At 914, the UE may select a second subset of UL scheduling information (e.g., the UE-selected UL scheduling information) of second subset of UL scheduling information among the plurality of UL scheduling information other than the first subset of UL scheduling information. Here, the second subset of UL scheduling information may be selected or determined based on second subset of UL scheduling information. In one aspect, the second subset of UL scheduling information that is to be selected at the UE may include at least one of RI, PMI, MCS, Tx beam including SRI or TCI, Tx power, TA, repetition factor, or frequency hopping. In another aspect, the second subset of UL scheduling information may be selected within a range or a set of candidate values of corresponding UL scheduling information. That is, the UE may select the second subset of UL scheduling information from the range or the set of candidate values configured for the network node and the UE or by the network node. For example, at 714, the UE 702 may select a second subset of UL scheduling information (e.g., the UE-selected UL scheduling information) of second subset of UL scheduling information among the plurality of UL scheduling information other than the first subset of UL scheduling information. Furthermore, 914 may be performed by the UL grant configuring component 198.

At 918, the UE may transmit the PUSCH to the network node based on the first subset of UL scheduling information and the second subset of UL scheduling information. The UE may transmit the UL transmission (e.g., the PUSCH) based on the UE-selected UL scheduling information, and the UL transmission may have reduced network overhead from reduced signaling and improved network energy efficiency from reduced power consumption. For example, at 718, the UE 702 may transmit the PUSCH to the network node 704 based on the first subset of UL scheduling information and the second subset of UL scheduling information. Furthermore, 918 may be performed by the UL grant configuring component 198.

Figure 10:
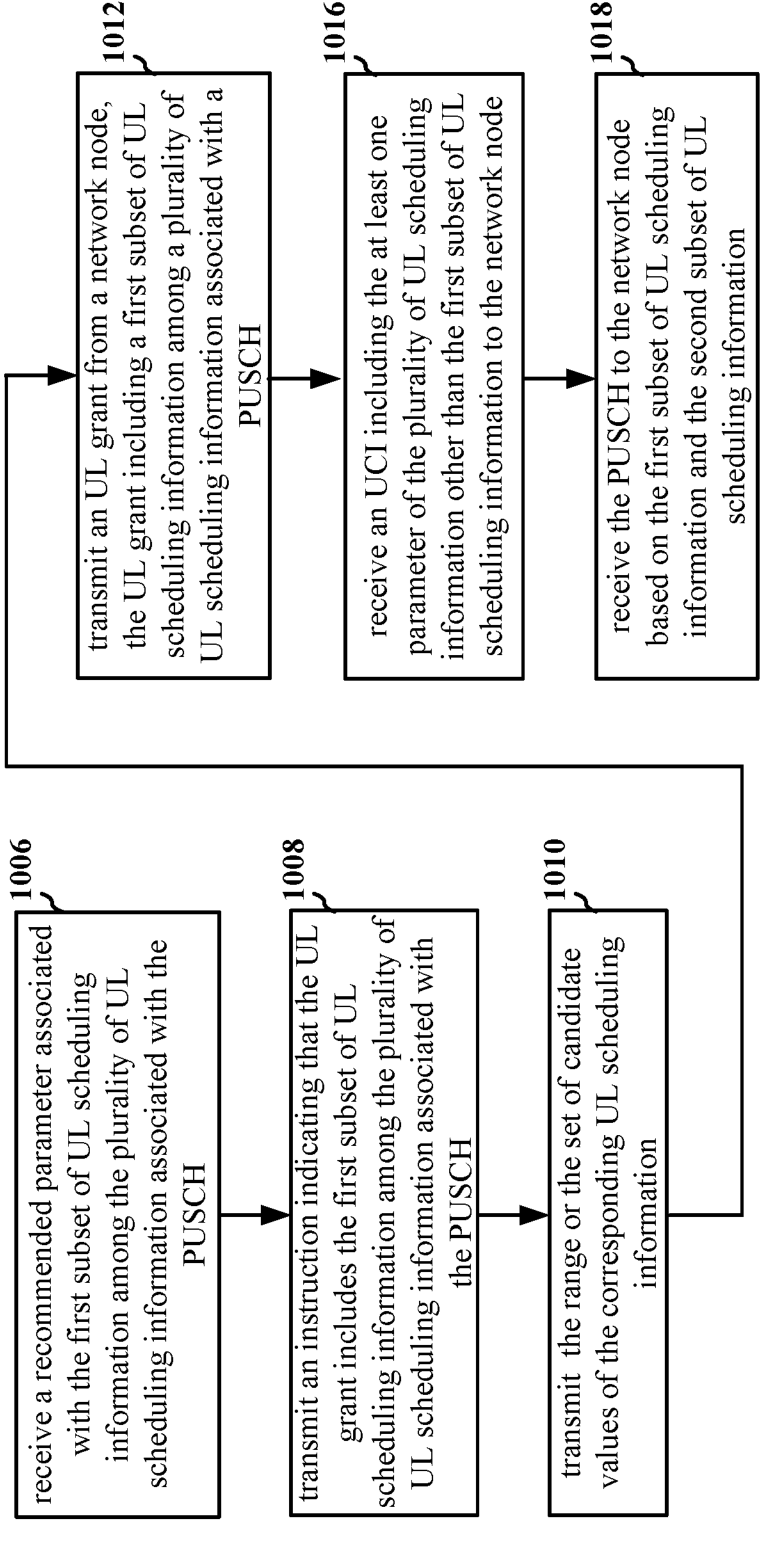
FIG. 10 is a flowchart of a method of wireless communication.

FIG. 10 is a flowchart 1000 of a method of wireless communication. The method may be performed by a network node (e.g., the base station 102; network node 404/504/604/704; the network entity 1302/1460). The network node may allow a UE to configure at least one UE-selected UL scheduling information of UL grant information and transmit the PUSCH based on the UL grant information including the at least one UE-selected UL scheduling information. The network node may transmit the UL grant including a first subset of UL scheduling information to the UE, and the UE may select or determine the at least one UE-selected UL scheduling information of the UL grant information. The UE may select or determine the at least one UE-selected UL scheduling information of the UL grant information based on the understanding of the channel status or device condition at the UE.

At 1006, the network node may receive a recommended parameter associated with the first subset of UL scheduling information among the plurality of UL scheduling information associated with the PUSCH. Here, the network node may receive the recommendation or the suggestion of the first subset of UL grant information from the UE based on the understanding of the channel status or device condition at the UE, and may accept or deny the recommended first subset of UL grant information received from the UE. For example, at 706, the network node 704 may receive a recommended parameter associated with the first subset of UL scheduling information among the plurality of UL scheduling information associated with the PUSCH. Furthermore, 1006 may be performed by a UL grant configuration component 199.

At 1008, the network node may transmit an instruction indicating that the UL grant includes the first subset of UL scheduling information among the plurality of UL scheduling information associated with the PUSCH. Here, the indication that the UL grant includes the first subset of UL scheduling information may be transmitted from the network node to the UE as a part of an initial configuration of the UL scheduling to the UE. That is, the network node may indicate the UE of the first subset of UL scheduling information or the UE-selected UL scheduling information using the initial configuration. For example, at 708, the network node 704 may transmit an instruction indicating that the UL grant includes the first subset of UL scheduling information among the plurality of UL scheduling information associated with the PUSCH. Furthermore, 1008 may be performed by the UL grant configuration component 199.

At 1010, the network node may transmit a range or a set of candidate values of a corresponding UL scheduling information for the UE to select the second subset of UL scheduling information. Here, the range or a set of candidate values of a corresponding UE-selected UL scheduling information may be transmitted from the network node to the UE as a part of an initial configuration of the UL scheduling to the UE. That is, the network node may indicate the range or the set of candidate values of the UE-selected UL scheduling information configured for the network node and the UE. The range or the set of candidate values may be configured for each of the UE-selected UL scheduling information, and the UE may select the UE-selected UL scheduling information within the range or the set of candidate values received from the network node. For example, at 710, the network node 704 may transmit a range or a set of candidate values of a corresponding UL scheduling information for the UE 702 to select the second subset of UL scheduling information. Furthermore, 1010 may be performed by the UL grant configuration component 199.

At 1012, the network node may transmit an UL grant to a UE, the UL grant including a first subset of UL scheduling information among a plurality of UL scheduling information associated with a PUSCH. In one example, the first subset of UL scheduling information may correspond with the recommended parameter associated with the first subset of UL scheduling information among the plurality of UL scheduling information associated with the PUSCH at 1006. In another example, the first subset of UL scheduling information in the UL scheduling grant may be different that the first subset of UL scheduling information or the UE-selected UL scheduling information indicated at 1010. Here, the UL grant may be received semi-statically or dynamically. In one aspect, the first subset of UL scheduling information may include at least one of a TDRA or a FDRA associated with the PUSCH. The first subset of UL scheduling information may further include at least one of a RI, a TPMI, or a SRI. For example, at 712, the network node 704 may transmit an UL grant to a UE 702, the UL grant including a first subset of UL scheduling information among a plurality of UL scheduling information associated with a PUSCH. Furthermore, 1012 may be performed by the UL grant configuration component 199.

At 1016, the network node may transmit an UCI including the second subset of UL scheduling information of the plurality of UL scheduling information other than the first subset of UL scheduling information to the network node. For example, at 716, the network node 704 may transmit an UCI including the second subset of UL scheduling information of the plurality of UL scheduling information other than the first subset of UL scheduling information to the network node 704. Furthermore, 1016 may be performed by a UL grant configuration component 199.

The UE-selected UL scheduling information may be transmitted to the network node in a dedicated UCI. The dedicated UCI may be configured for the network node and the UE or configured by the network node for the UE. For example, the size of the UCI may be configured by an RRC signaling or indicated by the DCI (e.g., by a beta offset). The MCS of the UCI may be configured (e.g. RRC configured modulation order and mother code size) for both of the network node and the UE. The UCI may be transmitted via at least one of a PUCCH or the PUSCH. In one example, the dedicated UCI may be transmitted on a separate PUCCH. In another example, the dedicated UCI may be multiplexed with other UCIs, if any, such as HARQ-ACK feedback, CSI report, etc. In another example, the dedicated UCI may be piggybacked on the corresponding UL data transmission (e.g., the PUSCH scheduled by the UL grant).

In one aspect, the dedicated UCI carrying the UE-selected UL scheduling information may include other information to help the network node to change its future scheduling strategy. For example, the UCI may further include at least one of a prediction of an UL beam or CSI at the UE, a change in power or battery state of the UE, or a request for a follow-up UL grant.

The dedicated UCI may also include a request for follow-up grants. For example, the UL grant including the TDRA/FDRA may not be large enough to transmit all of the UL data, and the UE may request the follow-up grants. In one example, for the CG, the follow-up grant may be another CG or a DG.

The dedicated UCI may also indicate whether to change the scheduling strategy for the corresponding UL transmission, or for the future UL scheduling. In one example, the dedicated UCI associated with the UL scheduling of the PUSCH may include an indication to change the UL scheduling strategy for the PUSCH, and revert to the original UL scheduling strategy for the future PUSCHs. In another example, the UCI associated with the UL scheduling of the PUSCH may include an indication to change the UL scheduling strategy for the PUSCH and the future PUSCHs.

In some aspects, at least one timeline configuration associated with the UE-selected UL scheduling information may be provided. The at least one timeline configuration may include at least one of an applicable time, an application time, or a processing time. The applicable time may refer to a time duration for which the UL scheduling information determined or recommended by the UE may be valid and usable, the application time may refer to the time for the UE to apply the UE-selected UL scheduling information in future UL scheduled transmission, and the processing time may refer to the time for the UE to process the UE-selected UL scheduling information.

In one aspect, the applicable time for the UE to determine and recommend UL scheduling information may be configured and indicated along with the UL grant configuration information signaling. The applicable time may indicate the duration for which the indicated parameters are valid and usable for the network node. That is, the application time may be configured to indicate the time duration that the indicated parameters are valid. The UE may include the applicable time in the UCI and indicate the applicable time to the network node via the UCI.

In another aspect, the application time may be configured to indicate the time duration for applying the UE-selected UL scheduling information in future UL scheduled transmission. For example, the future UL scheduled transmission may be DG. In one example, the application time may be indicated along with the UE recommendation or the suggestion of the UL grant information. In another aspect, the application time may be configured for the network node and the UE. For example, the application time may determine the number of slots after which the indicated parameters would be assumed by UE for UL transmission, and e.g. the UE and the network node may autonomously switch to using the indicated parameters.

In another aspect, the processing time may be configured for the UE to process the UE-selected UL scheduling information. That is, the processing time may refer to the preparation time for the UE to start a scheduled transmission after receiving the UL grant, with or without the first subset of UL grant information. The processing time for the reverse UL scheduling (based on UE side scheduling parameter info) may be different from the UL scheduling based on network node indicated UL scheduling. In one example, the processing time may be associated with a UE capability and signaled as a UE feature. In another example, the processing time may be a new parameter configured as a function of the SCS configured for the network node and the UE.

At 1018, the network node may receive the PUSCH from the UE based on the first subset of UL scheduling information and the second subset of UL scheduling information. The UE may transmit the UL transmission (e.g., the PUSCH) based on the UE-selected UL scheduling information, and the UL transmission may have reduced network overhead from reduced signaling and improved network energy efficiency from reduced power consumption. For example, at 718, the network node 704 may receive the PUSCH from the UE 702 based on the first subset of UL scheduling information and the second subset of UL scheduling information. Furthermore, 1018 may be performed by the UL grant configuration component 199.

FIG. 11 is a flowchart 1100 of a method of wireless communication. The method may be performed by a network node (e.g., the base station 102; network node 404/504/604/704; the network entity 1302/1460). The network node may allow a UE to configure a second subset of UL scheduling information including at least one UE-selected UL scheduling information of UL grant information and transmit the PUSCH based on the UL grant information including the at least one UE-selected UL scheduling information. The network node may transmit the UL grant including a first subset of UL scheduling information to the UE, and the UE may select or determine the at least one UE-selected UL scheduling information of the UL grant information. The UE may select or determine the at least one UE-selected UL scheduling information of the UL grant information based on the understanding of the channel status or device condition at the UE.

At 1112, the network node may transmit an UL grant to a UE, the UL grant including a first subset of UL scheduling information among a plurality of UL scheduling information associated with a PUSCH. In one example, the first subset of UL scheduling information may correspond with the recommended parameter associated with the first subset of UL scheduling information among the plurality of UL scheduling information associated with the PUSCH at 1106. In another example, the first subset of UL scheduling information in the UL scheduling grant may be different that the first subset of UL scheduling information or the UE-selected UL scheduling information indicated at 1110. Here, the UL grant may be received semi-statically or dynamically. In one aspect, the first subset of UL scheduling information may include at least one of a TDRA or a FDRA associated with the PUSCH. The first subset of UL scheduling information may further include at least one of a RI, a TPMI, or a SRI. For example, at 712, the network node 704 may transmit an UL grant to a UE 702, the UL grant including a first subset of UL scheduling information among a plurality of UL scheduling information associated with a PUSCH. Furthermore, 1112 may be performed by the UL grant configuration component 199.

At 1116, the network node may transmit an UCI including the second subset of UL scheduling information of the plurality of UL scheduling information other than the first subset of UL scheduling information to the network node. For example, at 716, the network node 704 may transmit an UCI including the second subset of UL scheduling information of the plurality of UL scheduling information other than the first subset of UL scheduling information to the network node 704. Furthermore, 1116 may be performed by a UL grant configuration component 199.

The UE-selected UL scheduling information may be transmitted to the network node in a dedicated UCI. The dedicated UCI may be configured for the network node and the UE or configured by the network node for the UE. For example, the size of the UCI may be configured by an RRC signaling or indicated by the DCI (e.g., by a beta offset). The MCS of the UCI may be configured (e.g. RRC configured modulation order and mother code size) for both of the network node and the UE. The UCI may be transmitted via at least one of a PUCCH or the PUSCH. In one example, the dedicated UCI may be transmitted on a separate PUCCH. In another example, the dedicated UCI may be multiplexed with other UCIs, if any, such as HARQ-ACK feedback, CSI report, etc. In another example, the dedicated UCI may be piggybacked on the corresponding UL data transmission (e.g., the PUSCH scheduled by the UL grant).

In one aspect, the dedicated UCI carrying the UE-selected UL scheduling information may include other information to help the network node to change its future scheduling strategy. For example, the UCI may further include at least one of a prediction of an UL beam or CSI at the UE, a change in power or battery state of the UE, or a request for a follow-up UL grant.

The dedicated UCI may also include a request for follow-up grants. For example, the UL grant including the TDRA/FDRA may not be large enough to transmit all of the UL data, and the UE may request the follow-up grants. In one example, for the CG, the follow-up grant may be another CG or a DG.

The dedicated UCI may also indicate whether to change the scheduling strategy for the corresponding UL transmission, or for the future UL scheduling. In one example, the dedicated UCI associated with the UL scheduling of the PUSCH may include an indication to change the UL scheduling strategy for the PUSCH, and revert to the original UL scheduling strategy for the future PUSCHs. In another example, the UCI associated with the UL scheduling of the PUSCH may include an indication to change the UL scheduling strategy for the PUSCH and the future PUSCHs.

In some aspects, at least one timeline configuration associated with the UE-selected UL scheduling information may be provided. The at least one timeline configuration may include an application time applicable time for the UE to determine and recommend UL scheduling information may be configured and indicated along with the UL grant configuration information signaling, an application time for applying the UE-selected UL scheduling information in future UL scheduled transmission, or a processing time for the UE to process the UE-selected UL scheduling information.

In one aspect, the applicable time for the UE to determine and recommend UL scheduling information may be configured and indicated along with the UL grant configuration information signaling. The applicable time may indicate the duration for which the indicated parameters are valid and usable for the network node. That is, the application time may be configured to indicate the time duration that the indicated parameters are valid. The UE may include the applicable time in the UCI and indicate the applicable time to the network node via the UCI.

In another aspect, the application time may be configured to indicate the time duration for applying the UE-selected UL scheduling information in future UL scheduled transmission. For example, the future UL scheduled transmission may be DG. In one example, the application time may be indicated along with the UE recommendation or the suggestion of the UL grant information. In another aspect, the application time may be configured for the network node and the UE. For example, the application time may determine the number of slots after which the indicated parameters would be assumed by UE for UL transmission, and e.g. the UE and the network node may autonomously switch to using the indicated parameters.

In another aspect, the processing time may be configured for the UE to process the UE-selected UL scheduling information. That is, the processing time may refer to the preparation time for the UE to start a scheduled transmission after receiving the UL grant, with or without the first subset of UL grant information. The processing time for the reverse UL scheduling (based on UE side scheduling parameter info) may be different from the UL scheduling based on network node indicated UL scheduling. In one example, the processing time may be associated with a UE capability and signaled as a UE feature. In another example, the processing time may be a new parameter configured as a function of the SCS configured for the network node and the UE.

At 1118, the network node may receive the PUSCH from the UE based on the first subset of UL scheduling information and the second subset of UL scheduling information. The UE may transmit the UL transmission (e.g., the PUSCH) based on the UE-selected UL scheduling information, and the UL transmission may have reduced network overhead from reduced signaling and improved network energy efficiency from reduced power consumption. For example, at 718, the network node 704 may receive the PUSCH from the UE 702 based on the first subset of UL scheduling information and the second subset of UL scheduling information. Furthermore, 1118 may be performed by the UL grant configuration component 199.

Figure 12:
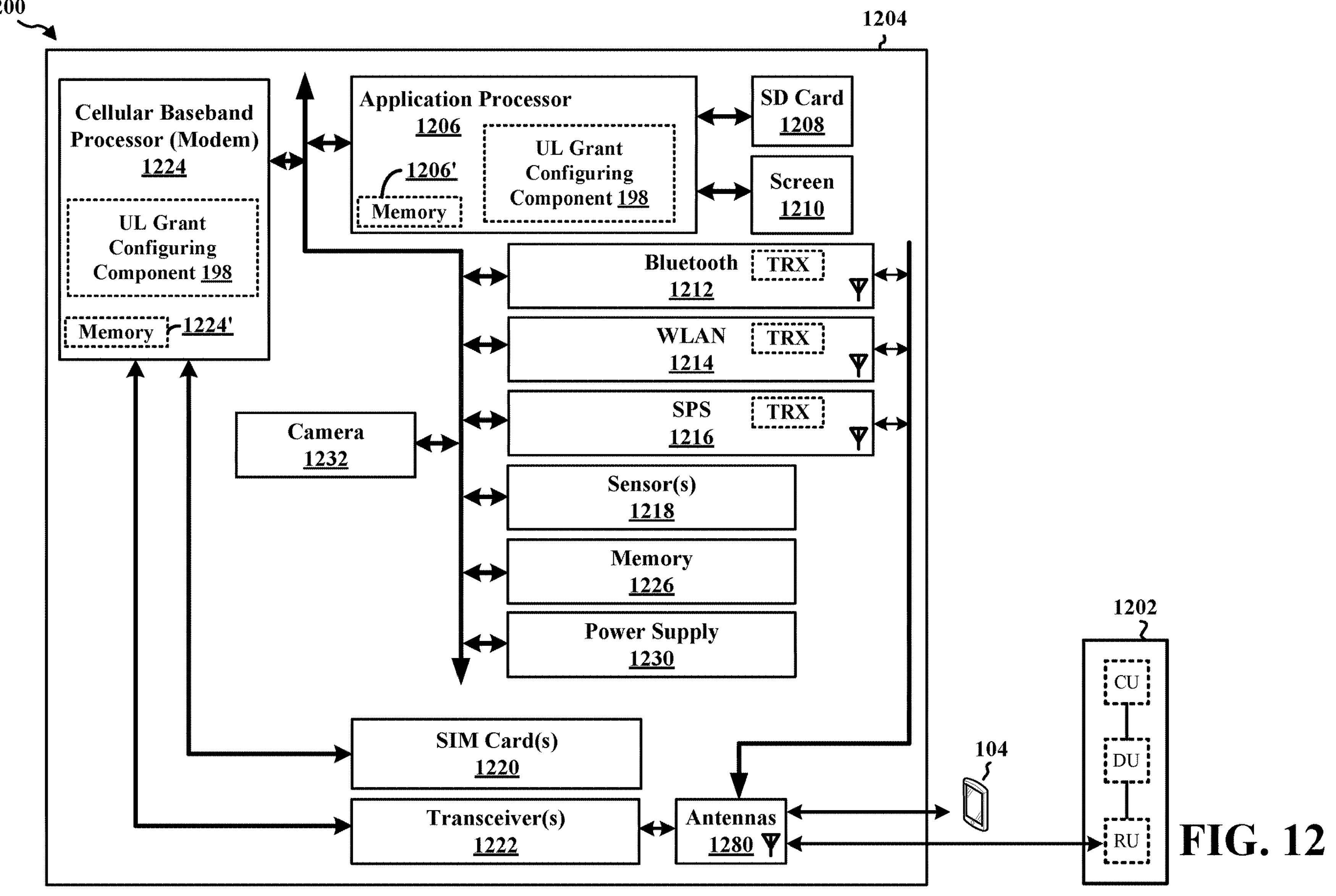
FIG. 12 is a diagram illustrating an example of a hardware implementation for an example apparatus and/or network entity.

FIG. 12 is a diagram 1200 illustrating an example of a hardware implementation for an apparatus 1204. The apparatus 1204 may be a UE, a component of a UE, or may implement UE functionality. In some aspects, the apparatus 1104 may include a cellular baseband processor 1224 (also referred to as a modem) coupled to one or more transceivers 1222 (e.g., cellular RF transceiver). The cellular baseband processor 1224 may include on-chip memory 1224'. In some aspects, the apparatus 1204 may further include one or more subscriber identity modules (SIM) cards 1220 and an application processor 1206 coupled to a secure digital (SD) card 1208 and a screen 1210. The application processor 1206 may include on-chip memory 1206'. In some aspects, the apparatus 1204 may further include a Bluetooth module 1212, a WLAN module 1214, an SPS module 1216 (e.g., GNSS module), one or more sensor modules 1218 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1226, a power supply 1230, and/or a camera 1232. The Bluetooth module 1212, the WLAN module 1214, and the SPS module 1216 may include an on-chip transceiver (TRX) (or in some cases, just a receiver (RX)). The Bluetooth module 1212, the WLAN module 1214, and the SPS module 1216 may include their own dedicated antennas and/or utilize the antennas 1280 for communication. The cellular baseband processor 1224 communicates through the transceiver(s) 1222 via one or more antennas 1280 with the UE 104 and/or with an RU associated with a network entity 1202. The cellular baseband processor 1224 and the application processor 1206 may each include a computer-readable medium/memory 1224', 1206', respectively. The additional memory modules 1226 may also be considered a computer-readable medium/memory. Each computer-readable medium/memory 1224', 1206', 1226 may be non-transitory. The cellular baseband processor 1224 and the application processor 1206 are each responsible for general processing, including the execution of software stored on the computer-readable medium/memory. The software, when executed by the cellular baseband processor 1224/application processor 1206, causes the cellular baseband processor 1224/application processor 1206 to perform the various functions described supra. The computer-readable medium/memory may also be used for storing data that is manipulated by the cellular baseband processor 1224/application processor 1206 when executing software. The cellular baseband processor 1224/application processor 1206 may be a component of the UE 350 and may include the memory 360 and/or at least one of the TX processor 368, the RX processor 356, and the controller/processor 359. In one configuration, the apparatus 1204 may be a processor chip (modem and/or application) and include just the cellular baseband processor 1224 and/or the application processor 1206, and in another configuration, the apparatus 1204 may be the entire UE (e.g., see 350 of FIG. 3) and include the additional modules of the apparatus 1204.

As discussed supra, the UL grant configuring component 198 is configured to receive an UL grant from a network node, the UL grant including a first subset of UL scheduling information among a plurality of UL scheduling information associated with a PUSCH, select a second subset of UL scheduling information among the plurality of UL scheduling information other than the first subset of UL scheduling information, and transmit the PUSCH to the network node based on the first subset of UL scheduling information and the second subset of UL scheduling information. The UL grant configuring component 198 may be within the cellular baseband processor 1224, the application processor 1206, or both the cellular baseband processor 1224 and the application processor 1206. The UL grant configuring component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1204 may include a variety of components configured for various functions. In one configuration, the apparatus 1204, and in particular the cellular baseband processor 1224 and/or the application processor 1206, includes means for receiving an UL grant from a network node, the UL grant including a first subset of UL scheduling information among a plurality of UL scheduling information associated with a PUSCH, means for selecting second subset of UL scheduling information of the plurality of UL scheduling information other than the first subset of UL scheduling information, and means for transmitting the PUSCH to the network node based on the first subset of UL scheduling information and the second subset of UL scheduling information selected by the UE. In one configuration, the first subset of UL scheduling information includes at least one of a TDRA or a FDRA associated with the PUSCH. In one configuration, the first subset of UL scheduling information further includes at least one of a RI, a TPMI, or a SRI. In one configuration, the second subset of UL scheduling information of the plurality of UL scheduling information to be selected at the UE includes at least one of RI, PMI, MCS, Tx beam including SRI or TCI, Tx power, TA, repetition factor, or frequency hopping. In one configuration, the second subset of UL scheduling information is selected within a range or a set of candidate values of corresponding UL scheduling information. In one configuration, the apparatus 1204, and in particular the cellular baseband processor 1224 and/or the application processor 1206, further includes means for receiving the range or the set of candidate values of the corresponding UL scheduling information. In one configuration, the apparatus 1204, and in particular the cellular baseband processor 1224 and/or the application processor 1206, further includes means for receiving an instruction indicating that the UL grant includes the first subset of UL scheduling information among the plurality of UL scheduling information associated with the PUSCH. In one configuration, the apparatus 1204, and in particular the cellular baseband processor 1224 and/or the application processor 1206, further includes means for transmitting a recommended parameter associated with the first subset of UL scheduling information among the plurality of UL scheduling information associated with the PUSCH. In one configuration, the UL grant is received semi-statically or dynamically. In one configuration, the apparatus 1204, and in particular the cellular baseband processor 1224 and/or the application processor 1206, further includes means for transmitting an UCI including the second subset of UL scheduling information of the plurality of UL scheduling information other than the first subset of UL scheduling information to the network node. In one configuration, the UCI is transmitted via at least one of a PUCCH or the PUSCH. In one configuration, the UCI further includes at least one of a prediction of an UL beam or CSI at the UE, a change in power or battery state of the UE, or a request for a follow-up UL grant. In one configuration, the UCI includes an applicable time duration that the second subset of UL scheduling information of the plurality of UL scheduling information is valid. In one configuration, the PUSCH is transmitted based on the UL scheduling information of the plurality of UL scheduling information for an application time duration. In one configuration, the UCI includes the application time duration. In one configuration, the PUSCH is transmitted after a processing time from receiving UL grant from the network node. In one configuration, the processing time is associated with a UE capability. In one configuration, the processing time is determined based on a SCS. The means may be the UL grant configuring component 198 of the apparatus 1204 configured to perform the functions recited by the means. As described supra, the apparatus 1204 may include the TX processor 368, the RX processor 356, and the controller/processor 359. As such, in one configuration, the means may be the TX processor 368, the RX processor 356, and/or the controller/processor 359 configured to perform the functions recited by the means.

Figure 13:
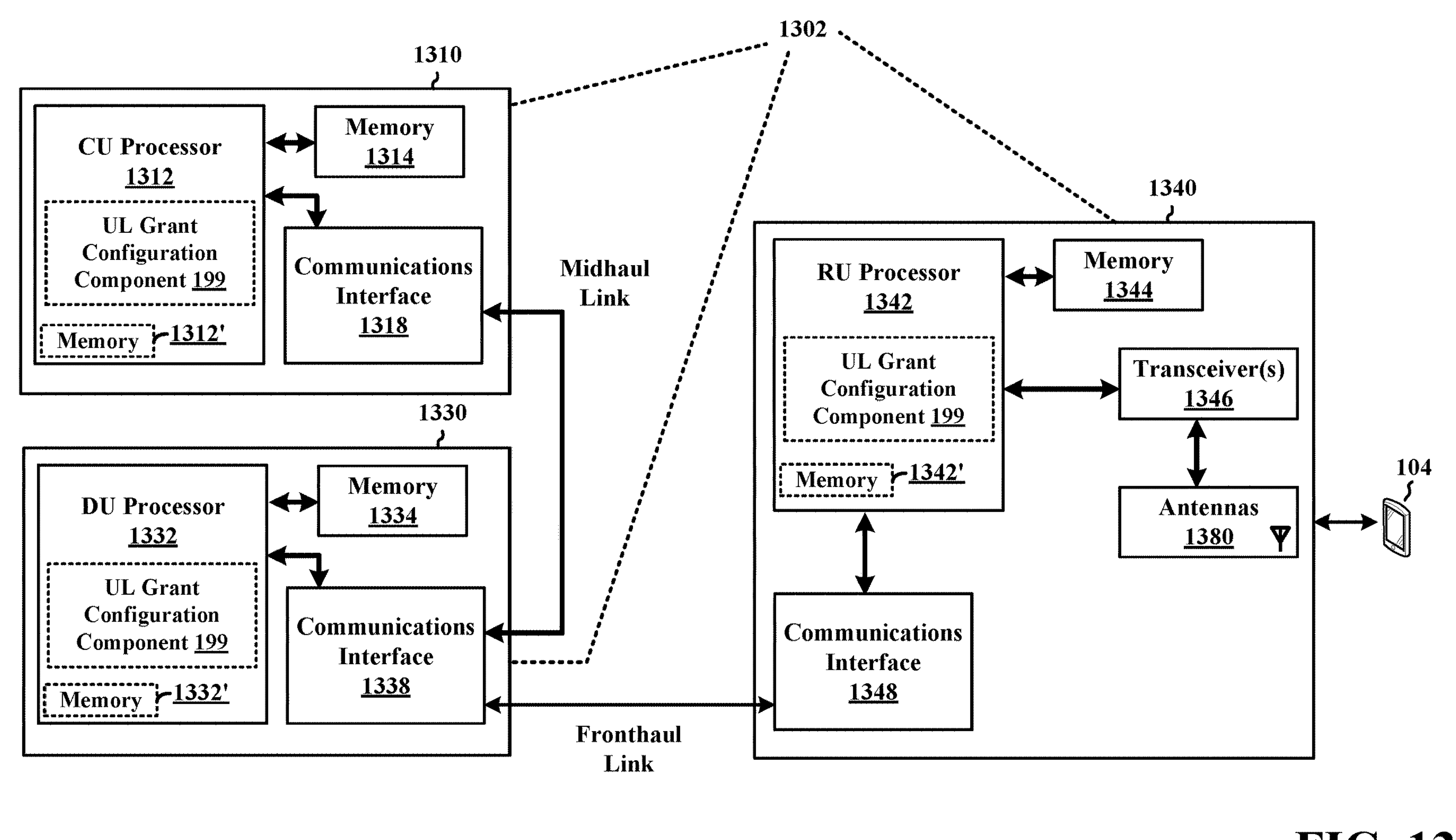
FIG. 13 is a diagram illustrating an example of a hardware implementation for an example network entity.

FIG. 13 is a diagram 1300 illustrating an example of a hardware implementation for a network entity 1302. The network entity 1302 may be a BS, a component of a BS, or may implement BS functionality. The network entity 1302 may include at least one of a CU 1310, a DU 1330, or an RU 1340. For example, depending on the layer functionality handled by the UL grant configuration component 199, the network entity 1302 may include the CU 1310; both the CU 1310 and the DU 1330; each of the CU 1310, the DU 1330, and the RU 1340; the DU 1330; both the DU 1330 and the RU 1340; or the RU 1340. The CU 1310 may include a CU processor 1312. The CU processor 1312 may include on-chip memory 1312'. In some aspects, the CU 1310 may further include additional memory modules 1314 and a communications interface 1318. The CU 1310 communicates with the DU 1330 through a midhaul link, such as an F1 interface. The DU 1330 may include a DU processor 1332. The DU processor 1332 may include on-chip memory 1332'. In some aspects, the DU 1330 may further include additional memory modules 1334 and a communications interface 1338. The DU 1330 communicates with the RU 1340 through a fronthaul link. The RU 1340 may include an RU processor 1342. The RU processor 1342 may include on-chip memory 1342'. In some aspects, the RU 1340 may further include additional memory modules 1344, one or more transceivers 1346, antennas 1380, and a communications interface 1348. The RU 1340 communicates with the UE 104. The on-chip memory 1312', 1332', 1342' and the additional memory modules 1314, 1334, 1344 may each be considered a computer-readable medium/memory. Each computer-readable medium/memory may be non-transitory. Each of the processors 1312, 1332, 1342 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the UL grant configuration component 199 is configured to transmit an UL grant to a UE, the UL grant including a first subset of UL scheduling information among a plurality of UL scheduling information associated with a PUSCH, receive an UCI from the UE, the UCI including second subset of UL scheduling information of the plurality of UL scheduling information other than the first subset of UL scheduling information, and receive the PUSCH from the UE based on the first subset of UL scheduling information and the second subset of UL scheduling information. The UL grant configuration component 199 may be within one or more processors of one or more of the CU 1310, DU 1330, and the RU 1340. The UL grant configuration component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1302 may include a variety of components configured for various functions. In one configuration, the network entity 1302 includes means for transmitting an UL grant to a UE, the UL grant including a first subset of UL scheduling information among a plurality of UL scheduling information associated with a PUSCH, means for receiving an UCI from the UE, the UCI including second subset of UL scheduling information of the plurality of UL scheduling information other than the first subset of UL scheduling information, and means for receiving the PUSCH from the UE based on the first subset of UL scheduling information and the second subset of UL scheduling information received from the UE. In one configuration, the network entity 1302 further includes means for transmitting a range or a set of candidate values of a corresponding UL scheduling information for the UE to select the second subset of UL scheduling information. In one configuration, the network entity 1302 further includes means for transmitting an instruction indicating that the UL grant includes the first subset of UL scheduling information among the plurality of UL scheduling information associated with the PUSCH. In one configuration, the network entity 1302 further includes means for receiving a recommended parameter associated with the first subset of UL scheduling information among the plurality of UL scheduling information associated with the PUSCH, where the UL grant is transmitted based at least in part on the recommended parameter associated with the first subset of UL scheduling information. In one configuration, the UCI is received via at least one of a PUCCH or the PUSCH. In one configuration, the UCI includes an applicable time duration that the UL scheduling information of the plurality of UL scheduling information is valid. In one configuration, the PUSCH is transmitted based on the UL scheduling information of the plurality of UL scheduling information for an application time duration. In one configuration, the UCI includes the application time duration. In one configuration, the PUSCH is transmitted after a processing time from receiving UL grant from the network node. In one configuration, the processing time is associated with a UE capability or determined based on a SCS. The means may be the UL grant configuration component 199 of the network entity 1302 configured to perform the functions recited by the means. As described supra, the network entity 1302 may include the TX processor 316, the RX processor 370, and the controller/processor 375. As such, in one configuration, the means may be the TX processor 316, the RX processor 370, and/or the controller/processor 375 configured to perform the functions recited by the means.

Figure 14:
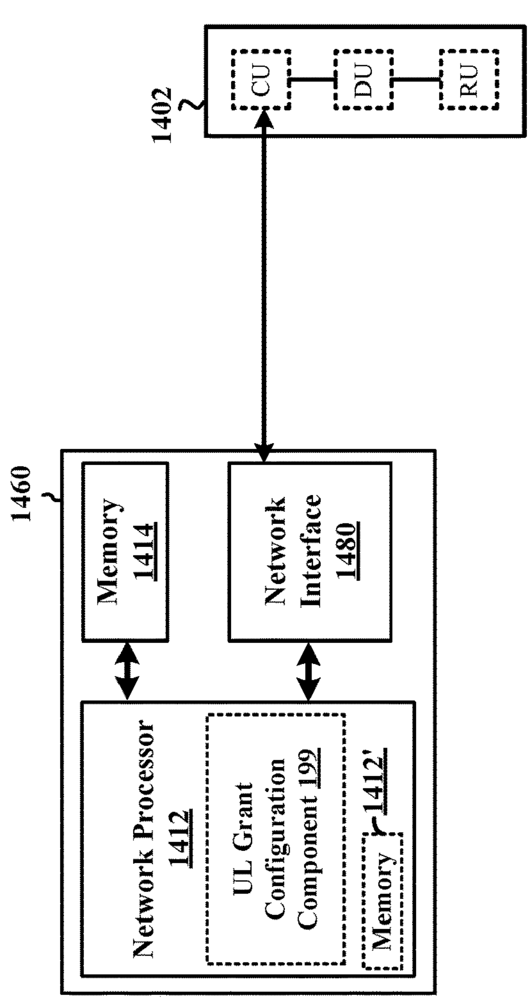
FIG. 14 is a diagram illustrating an example of a hardware implementation for an example network entity.

FIG. 14 is a diagram 1400 illustrating an example of a hardware implementation for a network entity 1460. In one example, the network entity 1460 may be within the core network 130. The network entity 1460 may include a network processor 1412. The network processor 1412 may include on-chip memory 1412'. In some aspects, the network entity 1460 may further include additional memory modules 1414. The network entity 1460 communicates via the network interface 1480 directly (e.g., backhaul link) or indirectly (e.g., through a RIC) with the CU 1402. The on-chip memory 1412' and the additional memory modules 1414 may each be considered a computer-readable medium/memory. Each computer-readable medium/memory may be non-transitory. The processor 1412 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the UL grant configuration component 199 is configured to transmit an UL grant to a UE, the UL grant including a first subset of UL scheduling information among a plurality of UL scheduling information associated with a PUSCH, receive an UCI from the UE, the UCI including second subset of UL scheduling information of the plurality of UL scheduling information other than the first subset of UL scheduling information, and receive the PUSCH from the UE based on the first subset of UL scheduling information and the second subset of UL scheduling information. The UL grant configuration component 199 may be within the processor 1412. The UL grant configuration component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1460 may include a variety of components configured for various functions. In one configuration, the network entity 1460 includes means for transmitting an UL grant to a UE, the UL grant including a first subset of UL scheduling information among a plurality of UL scheduling information associated with a PUSCH, means for receiving an UCI from the UE, the UCI including second subset of UL scheduling information of the plurality of UL scheduling information other than the first subset of UL scheduling information, and means for receiving the PUSCH from the UE based on the first subset of UL scheduling information and the second subset of UL scheduling information received from the UE. In one configuration, the network entity 1460 further includes means for transmitting a range or a set of candidate values of a corresponding UL scheduling information for the UE to select the second subset of UL scheduling information. In one configuration, the network entity 1460 further includes means for transmitting an instruction indicating that the UL grant includes the first subset of UL scheduling information among the plurality of UL scheduling information associated with the PUSCH. In one configuration, the network entity 1460 further includes means for receiving a recommended parameter associated with the first subset of UL scheduling information among the plurality of UL scheduling information associated with the PUSCH, where the UL grant is transmitted based at least in part on the recommended parameter associated with the first subset of UL scheduling information. In one configuration, the UCI is received via at least one of a PUCCH or the PUSCH. In one configuration, the UCI includes an applicable time duration that the UL scheduling information of the plurality of UL scheduling information is valid. In one configuration, the PUSCH is transmitted based on the UL scheduling information of the plurality of UL scheduling information for an application time duration. In one configuration, the UCI includes the application time duration. In one configuration, the PUSCH is transmitted after a processing time from receiving UL grant from the network node. In one configuration, the processing time is associated with a UE capability or determined based on a SCS. The means may be the UL grant configuration component 199 of the network entity 1460 configured to perform the functions recited by the means.

Some aspects of the current disclosure may include a network node and the network node may be configured to transmit an UL grant to a UE, the UL grant including a subset of UL scheduling information among a plurality of UL scheduling information associated with a PUSCH, receive an UCI from the UE, the UCI including at least one UL scheduling information of the at least one UL scheduling information among the plurality of UL scheduling information other than the subset of UL scheduling information, and receive the PUSCH from the UE based on the subset of UL scheduling information and the at least one UL scheduling information. Some aspects of the current disclosure may also include a UE and the UE may be configured to receive an UL grant from a network node, the UL grant including a subset of UL scheduling information among a plurality of UL scheduling information associated with a PUSCH, select at least one UL scheduling information among the plurality of UL scheduling information other than the subset of UL scheduling information, and transmit the PUSCH to the network node based on the subset of UL scheduling information and the at least one UL scheduling information.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, including receiving an UL grant from a network node, the UL grant including a first subset of UL scheduling information among a plurality of UL scheduling information associated with a PUSCH, selecting second subset of UL scheduling information of the plurality of UL scheduling information other than the first subset of UL scheduling information, and transmitting the PUSCH to the network node based on the first subset of UL scheduling information and the second subset of UL scheduling information selected by the UE.

Aspect 2 is the method of aspect 1, where the first subset of UL scheduling information includes at least one of a TDRA or a FDRA associated with the PUSCH.

Aspect 3 is the method of any of aspects 1 and 2, further including a transceiver coupled to the at least one processor, where the first subset of UL scheduling information further includes at least one of a RI, a TPMI, or a SRI.

Aspect 4 is the method of any of aspects 1 to 3, where the second subset of UL scheduling information of the plurality of UL scheduling information to be selected at the UE includes at least one of RI, PMI, MCS, Tx beam including SRI or TCI, Tx power, TA, repetition factor, or frequency hopping.

Aspect 5 is the method of any of aspects 1 to 4, where the second subset of UL scheduling information is selected within a range or a set of candidate values of corresponding UL scheduling information.

Aspect 6 is the method of aspect 5, further including receiving the range or the set of candidate values of the corresponding UL scheduling information.

Aspect 7 is the method of any of aspects 1 to 6, further including receiving an instruction indicating that the UL grant includes the first subset of UL scheduling information among the plurality of UL scheduling information associated with the PUSCH.

Aspect 8 is the method of any of aspects 1 to 7, further including transmitting a recommended parameter associated with the first subset of UL scheduling information among the plurality of UL scheduling information associated with the PUSCH.

Aspect 9 is the method of any of aspects 1 to 8, where the UL grant is received semi-statically or dynamically.

Aspect 10 is the method of any of aspects 1 to 9, further including transmitting an UCI including the second subset of UL scheduling information of the plurality of UL scheduling information other than the first subset of UL scheduling information to the network node.

Aspect 11 is the method of aspect 10, where the UCI is transmitted via at least one of a PUCCH or the PUSCH.

Aspect 12 is the method of any of aspects 10 and 11, where the UCI further includes at least one of a prediction of an UL beam or CSI at the UE, a change in power or battery state of the UE, or a request for a follow-up UL grant.

Aspect 13 is the method of any of aspects 10 to 12, where the UCI includes an applicable time duration that the second subset of UL scheduling information of the plurality of UL scheduling information is valid.

Aspect 14 is the method of any of aspects 10 to 13, where the PUSCH is transmitted based on the UL scheduling information of the plurality of UL scheduling information for an application time duration.

Aspect 15 is the method of aspect 14, where the UCI includes the application time duration.

Aspect 16 is the method of any of aspects 10 to 15, where the PUSCH is transmitted after a processing time from receiving UL grant from the network node.

Aspect 17 is the method of aspect 16, where the processing time is associated with a UE capability.

Aspect 18 is the method of any of aspects 16 and 17, where the processing time is determined based on a SCS.

Aspect 19 is an apparatus for wireless communication including at least one processor coupled to a memory and configured to implement any of aspects 1 to 18, further including a transceiver coupled to the at least one processor.

Aspect 20 is an apparatus for wireless communication including means for implementing any of aspects 1 to 18.

Aspect 21 is a non-transitory computer-readable medium storing computer executable code, where the code when executed by a processor causes the processor to implement any of aspects 1 to 18.

Aspect 22 is a method of wireless communication at a network node, including transmitting an UL grant to a UE, the UL grant including a first subset of UL scheduling information among a plurality of UL scheduling information associated with a PUSCH, receiving an UCI from the UE, the UCI including second subset of UL scheduling information of the plurality of UL scheduling information other than the first subset of UL scheduling information, and receiving the PUSCH from the UE based on the first subset of UL scheduling information and the second subset of UL scheduling information received from the UE.

Aspect 23 is the method of aspect 22, further including transmitting a range or a set of candidate values of a corresponding UL scheduling information for the UE to select the second subset of UL scheduling information.

Aspect 24 is the method of any of aspects 22 and 23, further including transmitting an instruction indicating that the UL grant includes the first subset of UL scheduling information among the plurality of UL scheduling information associated with the PUSCH.

Aspect 25 is the method of any of aspects 22 to 24, further including receiving a recommended parameter associated with the first subset of UL scheduling information among the plurality of UL scheduling information associated with the PUSCH, where the UL grant is transmitted based at least in part on the recommended parameter associated with the first subset of UL scheduling information.

Aspect 26 is the method of any of aspects 22 to 25, where the UCI is received via at least one of a PUCCH or the PUSCH.

Aspect 27 is the method of any of aspects 22 to 26, where the UCI includes an applicable time duration that the UL scheduling information of the plurality of UL scheduling information is valid.

Aspect 28 is the method of any of aspects 22 to 27, where the PUSCH is transmitted based on the UL scheduling information of the plurality of UL scheduling information for an application time duration.

Aspect 29 is the method of aspect 28, where the UCI includes the application time duration.

Aspect 30 is the method of any of aspects 22 to 29, where the PUSCH is transmitted after a processing time from receiving UL grant from the network node.

Aspect 31 is the method of aspect 30, where the processing time is associated with a UE capability or determined based on a SCS.

Aspect 32 is an apparatus for wireless communication including at least one processor coupled to a memory and configured to implement any of aspects 22 to 31, further including a transceiver coupled to the at least one processor.

Aspect 33 is an apparatus for wireless communication including means for implementing any of aspects 22 to 31.

Aspect 34 is a non-transitory computer-readable medium storing computer executable code, where the code when executed by a processor causes the processor to implement any of aspects 22 to 31.

What is claimed is:

1. An apparatus for wireless communication at a user equipment (UE), comprising:
- memory; and
- at least one processor coupled to the memory, and based at least in part on information stored in the memory, the at least one processor is configured to:
  - receive an uplink (UL) grant from a network node, wherein the UL grant includes a first subset of UL scheduling information among a plurality of UL scheduling information associated with a physical UL shared channel (PUSCH);
  - select, at the UE, a second subset of UL scheduling information of the plurality of UL scheduling information other than the first subset of UL scheduling information, wherein the second subset of UL scheduling information includes at least one of:
    - rank indicator (RI),
    - precoding matrix indicator (PMI),
    - transmit (Tx) beam including sounding reference signal (SRS) resource indicator (SRI) or transmission configuration indicator (TCI),
    - repetition factor, or
    - frequency hopping;
  - transmit a PUSCH transmission to the network node based on the first subset of UL scheduling information and the second subset of UL scheduling information selected by the UE; and
  - transmit an UL control information (UCI) that includes the second subset of UL scheduling information of the plurality of UL scheduling information other than the first subset of UL scheduling information to the network node, wherein the UCI further includes at least one of:
    - a prediction of an UL beam or channel state information (CSI) at the UE,
    - a change in power or battery state of the UE,
    - a request for a follow-up UL grant,
    - an applicable time duration that the second subset of UL scheduling information of the plurality of UL scheduling information is valid, or
    - an application time duration for PUSCH transmissions to be transmitted based on the second subset of UL scheduling information of the plurality of scheduling information.

2. The apparatus of claim 1, further comprising a transceiver coupled to the at least one processor,
- wherein the first subset of UL scheduling information includes at least one of a time domain resource allocation (TDRA) or a frequency domain resource allocation (FDRA) associated with the PUSCH.

3. The apparatus of claim 1, wherein the first subset of UL scheduling information that is received from the network node further includes at least one of:
- the RI,
- a transmit precoding matrix index (TPMI), or
- the SRI, and
- wherein the second subset of the UL scheduling information that is selected by the UE includes at least one of:
  - the repetition factor, or
  - the frequency hopping.

4. The apparatus of claim 1, wherein the second subset of UL scheduling information is selected by the UE within a range or a set of candidate values of corresponding UL scheduling information, and wherein the at least one processor is further configured to:
- receive the range or the set of candidate values of the corresponding UL scheduling information.

5. The apparatus of claim 1, wherein the at least one processor is further configured to:
- receive an instruction that indicates the UL grant includes the first subset of UL scheduling information among the plurality of UL scheduling information associated with the PUSCH.

6. The apparatus of claim 1, wherein the at least one processor is further configured to:
- transmit a recommended parameter associated with the first subset of UL scheduling information among the plurality of UL scheduling information associated with the PUSCH.

7. The apparatus of claim 1, wherein the UL grant is received semi-statically or dynamically.

8. The apparatus of claim 1, wherein the UCI is transmitted via at least one of a physical UL control channel (PUCCH) or the PUSCH, and wherein the UCI further includes the at least one of:
- the prediction of the UL beam or the channel state information (CSI) at the UE,
- the change in the power or battery state of the UE, or
- the request for the follow-up UL grant.

9. The apparatus of claim 1, wherein the UCI includes the applicable time duration that the second subset of UL scheduling information of the plurality of UL scheduling information is valid.

10. The apparatus of claim 1, wherein the PUSCH transmissions are transmitted based on the second subset of UL scheduling information of the plurality of UL scheduling information for the application time duration, and wherein the UCI includes the application time duration.

11. The apparatus of claim 1, wherein the PUSCH transmission is transmitted after a processing time from reception of the UL grant from the network node.

12. The apparatus of claim 11, wherein the processing time is associated with a UE capability.

13. The apparatus of claim 11, wherein the processing time is determined based on a subcarrier spacing (SCS).

14. The apparatus of claim 1, wherein the second subset of UL scheduling information that is selected at the UE includes the RI for the PUSCH transmission.

15. The apparatus of claim 1, wherein the second subset of UL scheduling information that is selected at the UE includes the PMI for the PUSCH transmission.

16. The apparatus of claim 1, wherein the second subset of UL scheduling information that is selected at the UE includes the Tx beam including the SRI or the TCI for the PUSCH transmission.

17. The apparatus of claim 1, wherein the second subset of UL scheduling information that is selected at the UE for the PUSCH transmission includes the repetition factor for the PUSCH transmission.

18. The apparatus of claim 1, wherein the second subset of UL scheduling information that is selected at the UE for the PUSCH transmission includes the frequency hopping for the PUSCH transmission.

19. An apparatus for wireless communication at a network node, comprising:

memory; and at least one processor coupled to the memory, based at least in part on information stored in the memory, the at least one processor is configured to:

transmit an uplink (UL) grant to a user equipment (UE), wherein the UL grant includes a first subset of UL scheduling information among a plurality of UL scheduling information associated with a physical UL shared channel (PUSCH);

receive an UL control information (UCI) from the UE, wherein the UCI includes a second subset of UL scheduling information of the plurality of UL scheduling information other than the first subset of UL scheduling information, wherein the second subset of UL scheduling information includes at least one of:

rank indicator (RI), precoding matrix indicator (PMI), transmit (Tx) beam including sounding reference signal (SRS) resource indicator (SRI) or transmission configuration indicator (TCI), repetition factor, or frequency hopping;

receive a PUSCH transmission from the UE based on the first subset of UL scheduling information and the second subset of UL scheduling information received from the UE;

wherein the UCI that includes the second subset of UL scheduling information of the plurality of UL scheduling information other than the first subset of UL scheduling information further includes at least one of:

a prediction of an UL beam or channel state information (CSI) at the UE, a change in power or battery state of the UE, a request for a follow-up UL grant, an applicable time duration that the second subset of UL scheduling information of the plurality of UL scheduling information is valid, or an application time duration for PUSCH transmissions to be transmitted based on the second subset of UL scheduling information of the plurality of scheduling information.

20. The apparatus of claim 19, wherein the at least one processor is further configured to:

transmit a range or a set of candidate values of a corresponding UL scheduling information for the UE to select the second subset of UL scheduling information.

21. The apparatus of claim 19, wherein the at least one processor is further configured to:

transmit an instruction that indicates the UL grant includes the first subset of UL scheduling information among the plurality of UL scheduling information associated with the PUSCH.

22. The apparatus of claim 19, wherein the at least one processor is further configured to:

receive a recommended parameter associated with the first subset of UL scheduling information among the plurality of UL scheduling information associated with the PUSCH, wherein the UL grant is transmitted based at least in part on the recommended parameter associated with the first subset of UL scheduling information.

23. The apparatus of claim 19, wherein the UCI is received via at least one of a physical UL control channel (PUCCH) or the PUSCH, and wherein the UCI further includes the at least one of:

the prediction of the UL beam or the channel state information (CSI) at the UE, the change in the power or battery state of the UE, or the request for the follow-up UL grant.

24. The apparatus of claim 19, wherein the UCI includes the applicable time duration that the second subset of UL scheduling information of the plurality of UL scheduling information is valid.

25. The apparatus of claim 19, wherein the PUSCH transmissions are based on the second subset of UL scheduling information of the plurality of UL scheduling information for the application time duration, and wherein the UCI includes the application time duration.

26. The apparatus of claim 19, wherein the PUSCH transmission is received after a processing time from the UL grant from the network node, and wherein the processing time is associated with a UE capability or determined based on a subcarrier spacing (SCS).

27. A method of wireless communication at a user equipment (UE), comprising:

receiving an uplink (UL) grant from a network node, the UL grant including a first subset of UL scheduling information among a plurality of UL scheduling information associated with a physical UL shared channel (PUSCH);

selecting, at the UE, a second subset of UL scheduling information of the plurality of UL scheduling information other than the first subset of UL scheduling information, wherein the second subset of UL scheduling information includes at least one of:

rank indicator (RI), precoding matrix indicator (PMI), transmit (Tx) beam including sounding reference signal (SRS) resource indicator (SRI) or transmission configuration indicator (TCI), repetition factor, or frequency hopping;

transmitting the PUSCH to the network node based on the first subset of UL scheduling information and the second subset of UL scheduling information selected by the UE; and transmitting an UL control information (UCI) that includes the second subset of UL scheduling information of the plurality of UL scheduling information other than the first subset of UL scheduling information to the network node, wherein the UCI further includes at least one of:

a prediction of an UL beam or channel state information (CSI) at the UE, a change in power or battery state of the UE, a request for a follow-up UL grant, an applicable time duration that the second subset of UL scheduling information of the plurality of UL scheduling information is valid, or an application time duration for PUSCH transmissions to be transmitted based on the second subset of UL scheduling information of the plurality of scheduling information.

28. The method of claim 27, wherein the first subset of UL scheduling information includes at least one of a time domain resource allocation (TDRA) or a frequency domain resource allocation (FDRA) associated with the PUSCH.

29. A method of wireless communication at a network node, comprising:

transmitting an uplink (UL) grant to a user equipment (UE), the UL grant including a first subset of UL scheduling information among a plurality of UL scheduling information associated with a physical UL shared channel (PUSCH);

receiving an UL control information (UCI) from the UE, the UCI including a second subset of UL scheduling information of the plurality of UL scheduling information other than the first subset of UL scheduling information, wherein the second subset of UL scheduling information includes at least one of:

rank indicator (RI), precoding matrix indicator (PMI), transmit (Tx) beam including sounding reference signal (SRS) resource indicator (SRI) or transmission configuration indicator (TCI), repetition factor, or frequency hopping;

receiving the PUSCH from the UE based on the first subset of UL scheduling information and the second subset of UL scheduling information received from the UE;

wherein the UCI that includes the second subset of UL scheduling information of the plurality of UL scheduling information other than the first subset of UL scheduling information further includes at least one of:

a prediction of an UL beam or channel state information (CSI) at the UE, a change in power or battery state of the UE, a request for a follow-up UL grant, an applicable time duration that the second subset of UL scheduling information of the plurality of UL scheduling information is valid, or an application time duration for PUSCH transmissions to be transmitted based on the second subset of UL scheduling information of the plurality of scheduling information.

* * * * *